United States Patent
Kudo et al.

(10) Patent No.: US 9,571,720 B2
(45) Date of Patent: Feb. 14, 2017

(54) IMAGE PROCESSING DEVICE, DISPLAY DEVICE, IMAGING APPARATUS, IMAGE PROCESSING METHOD, AND PROGRAM

(71) Applicant: Olympus Corporation, Hachioji-shi, Tokyo (JP)

(72) Inventors: Yasunori Kudo, Hachioji (JP); Ryo Karasawa, Hachioji (JP); Kyoko Iijima, Hino (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/624,108

(22) Filed: Feb. 17, 2015

(65) Prior Publication Data
US 2015/0163396 A1 Jun. 11, 2015

Related U.S. Application Data

(63) Continuation of application No. PCT/JP2014/071934, filed on Aug. 21, 2014.

(30) Foreign Application Priority Data

Dec. 10, 2013 (JP) .................................. 2013-255425

(51) Int. Cl.
*H04N 5/232* (2006.01)
*H04N 5/262* (2006.01)

(52) U.S. Cl.
CPC ...... *H04N 5/23212* (2013.01); *H04N 5/23238* (2013.01); *H04N 5/23245* (2013.01);
(Continued)

(58) Field of Classification Search
USPC .......................... 348/208.99–208.16, 222.1, 223.1, 348/333.01–333.12
See application file for complete search history.

(56) References Cited

U.S. PATENT DOCUMENTS

5,986,698 A 11/1999 Nobuoka
6,198,504 B1 3/2001 Nobuoka
(Continued)

FOREIGN PATENT DOCUMENTS

JP 09-289612 11/1997
JP 2009-111855 5/2009
(Continued)

OTHER PUBLICATIONS

Notification of Transmittal of International Search Report and Written Opinion of International Search Authority (3 pgs.), International Search Report (2 pgs.) and Written Opinion of International Search Authority (4 pgs.) for PCT/JP2014/071934.

*Primary Examiner* — Michael Osinski
(74) *Attorney, Agent, or Firm* — John C. Pokotylo; Straub & Pokotylo

(57) ABSTRACT

An image processing device includes: a determining unit configured to determine, in accordance with two images corresponding to temporally adjacent image data input from an external device, whether or not a field area at a time of imaging has been changed; and a suppressing unit configured to generate and output suppressed image data with an amount of visually recognizable information included in the images being suppressed by performing image processing of reducing at least one of a contrast and a chroma of the images at a time the determining unit determines that the field area at the time of imaging has been changed.

4 Claims, 19 Drawing Sheets

(52) U.S. Cl.
CPC ..... *H04N 5/23258* (2013.01); *H04N 5/23287* (2013.01); *H04N 5/2624* (2013.01)

(56) References Cited

U.S. PATENT DOCUMENTS

| | | | | |
|---|---|---|---|---|
| 6,628,713 | B1* | 9/2003 | Kojima | H04N 19/142 348/699 |
| 8,260,077 | B2* | 9/2012 | Shen | H04N 5/144 348/154 |
| 8,947,554 | B2* | 2/2015 | Kitajima | H04N 5/142 348/223.1 |
| 9,041,821 | B2* | 5/2015 | Kashiwagi | H04N 5/2621 348/218.1 |
| 9,313,469 | B2* | 4/2016 | Kanda | H04N 5/23212 |
| 2007/0086675 | A1* | 4/2007 | Chinen | G06T 7/0081 382/284 |
| 2008/0158392 | A1* | 7/2008 | Nikata | G09G 5/377 348/234 |
| 2009/0128640 | A1* | 5/2009 | Yumiki | G03B 5/02 348/208.6 |
| 2009/0167909 | A1* | 7/2009 | Imagawa | G06T 3/4053 348/262 |
| 2009/0284582 | A1* | 11/2009 | Mei | G03B 37/00 348/36 |
| 2010/0214440 | A1 | 8/2010 | Hirose | |
| 2010/0271515 | A1* | 10/2010 | Imagawa | H04N 5/144 348/266 |
| 2011/0115942 | A1* | 5/2011 | Kurita | H04N 5/2355 348/223.1 |
| 2011/0157402 | A1* | 6/2011 | Kitajima | H04N 5/142 348/222.1 |
| 2011/0221927 | A1* | 9/2011 | Takagi | G11B 27/28 348/222.1 |
| 2012/0075412 | A1* | 3/2012 | Miyamoto | G03B 35/00 348/36 |
| 2012/0236164 | A1* | 9/2012 | Nakano | H04N 5/23219 348/208.1 |
| 2012/0236169 | A1* | 9/2012 | Oh | G06T 5/50 348/208.4 |
| 2013/0050542 | A1* | 2/2013 | Asukabe | G03B 13/00 348/241 |
| 2013/0063625 | A1* | 3/2013 | Yamanaka | G06K 9/36 348/239 |
| 2013/0242121 | A1* | 9/2013 | Kashiwagi | H04N 5/235 348/208.4 |
| 2015/0062410 | A1* | 3/2015 | Kim | H04N 5/2353 348/362 |
| 2015/0229823 | A1* | 8/2015 | Yasutomi | G09G 5/393 348/216.1 |

FOREIGN PATENT DOCUMENTS

| | | |
|---|---|---|
| JP | 2009-115681 | 5/2009 |
| JP | 2010-098698 | 4/2010 |
| JP | 2010-273268 | 12/2010 |

* cited by examiner

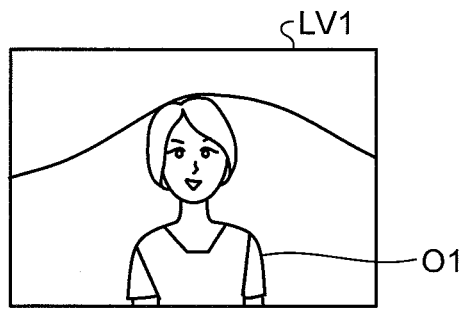
FIG.9A
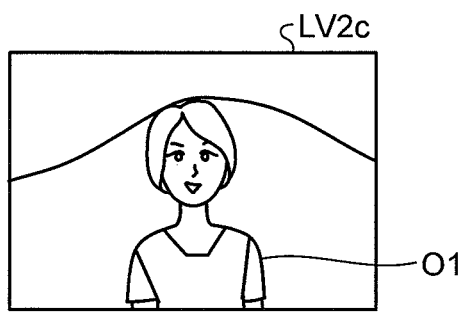
FIG.9B
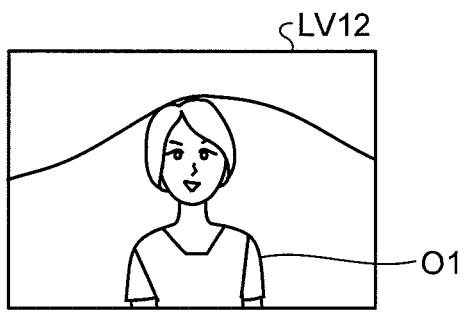
FIG.10

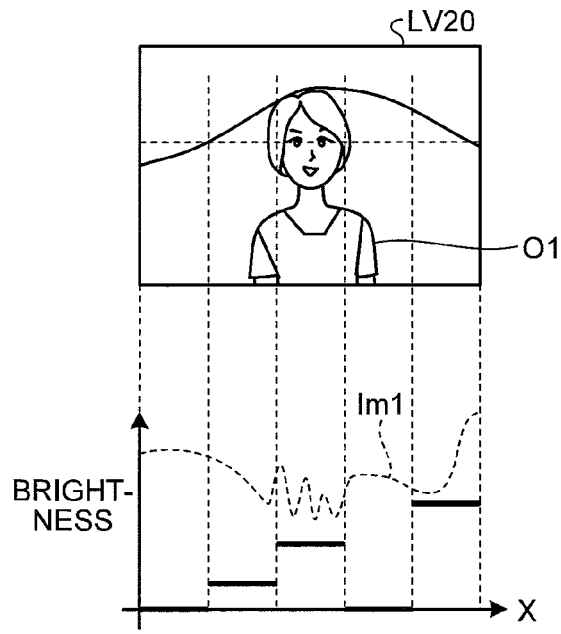
FIG.20A
FIG.20B
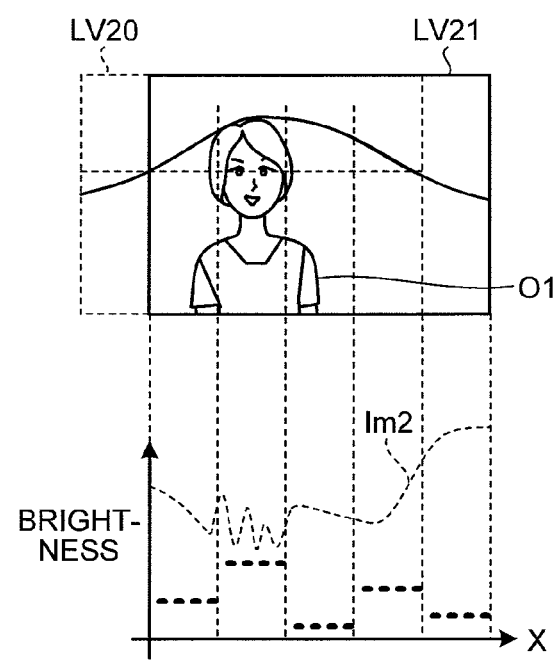
FIG.21A
FIG.21B

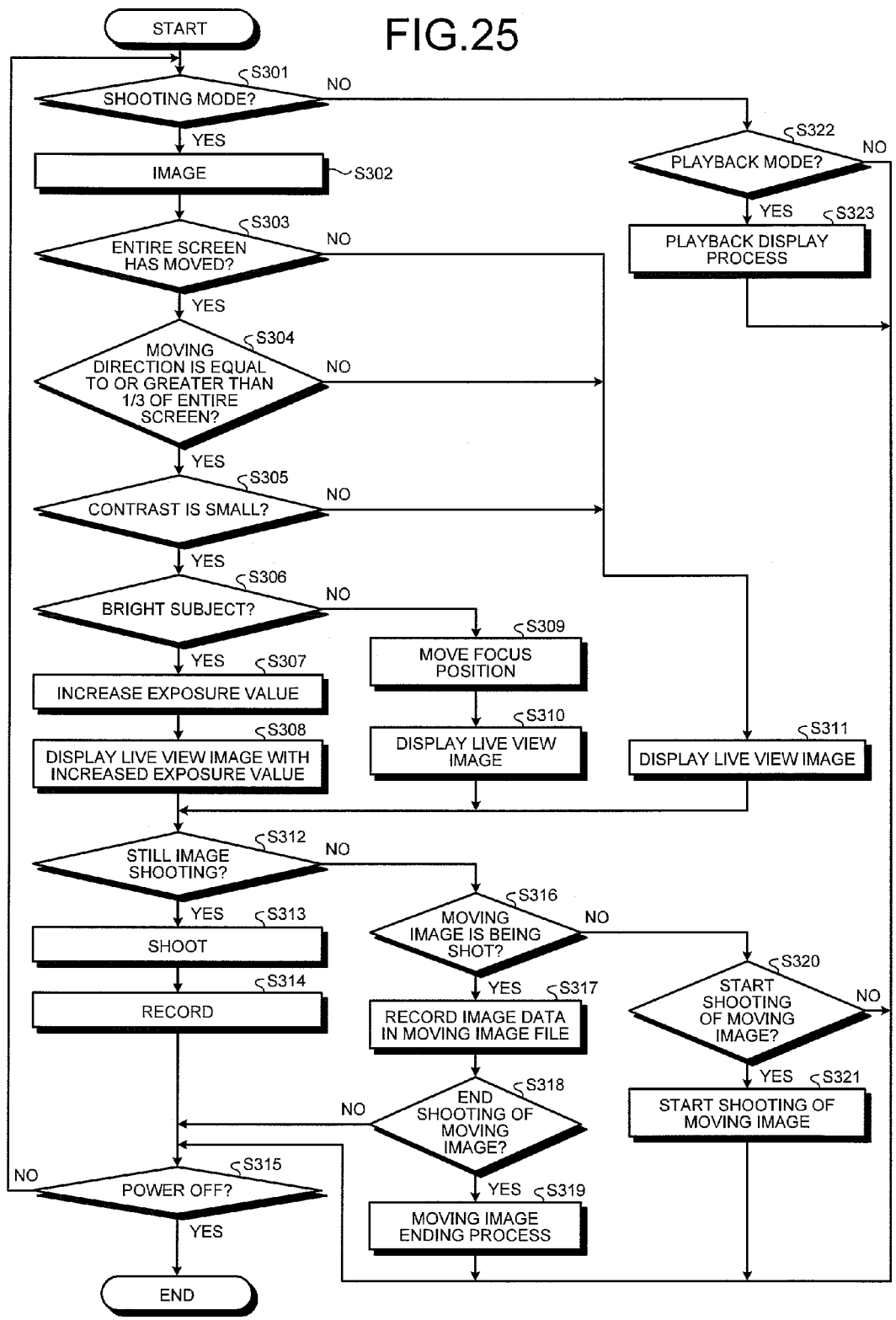

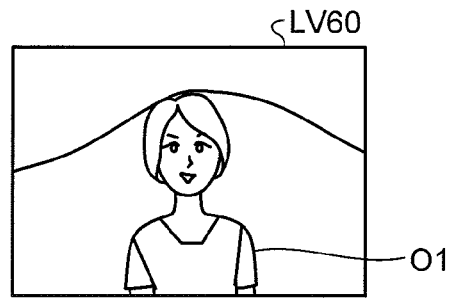
FIG.28A
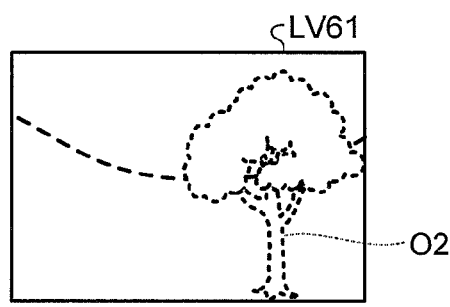
FIG.28B
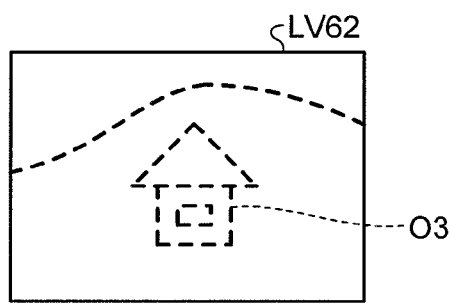
FIG.28C
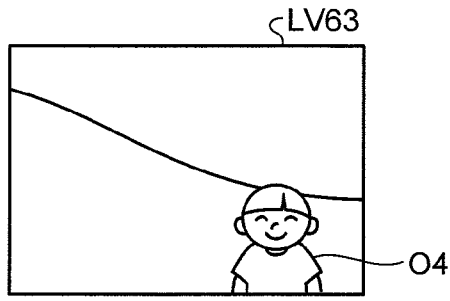
FIG.28D

IMAGE PROCESSING DEVICE, DISPLAY DEVICE, IMAGING APPARATUS, IMAGE PROCESSING METHOD, AND PROGRAM

CROSS REFERENCES TO RELATED APPLICATIONS

This application is a continuation of PCT international application Ser. No. PCT/JP2014/071934 filed on Aug. 21, 2014 which designates the United States, incorporated herein by reference, and which claims the benefit of priority from Japanese Patent Applications No. 2013-255425, filed on Dec. 10, 2013, incorporated herein by reference.

BACKGROUND OF THE INVENTION

1. Field of the Invention

The present invention relates to an image processing device that performs image processing on image data, a display device that includes the image processing device, an imaging apparatus that includes the display device, an image processing method that the image processing device performs, and a program.

2. Description of the Related Art

In recent years, when an imaging apparatus having a hand-shake correction function, such as a digital video camera, is shooting a moving image and a user performs a panning operation, a tilting operation, or another shooting screen changing operation, on top of the effect of the hand-shake correction, extra shaking is caused in the image upon the shooting. Therefore, a technique is known, which is for prohibiting or suppressing a hand-shake correction function when a user performs a panning operation, a tilting operation, or another shooting screen changing operation upon shooting of a moving image (see Japanese Laid-open Patent Publication No. 09-289612).

SUMMARY OF THE INVENTION

An image processing device according to one aspect of the present invention includes: a determining unit configured to determine, in accordance with two images corresponding to temporally adjacent image data input from an external device, whether or not a field area at a time of imaging has been changed; and a suppressing unit configured to generate and output suppressed image data with an amount of visually recognizable information included in the images being suppressed by performing image processing of reducing at least one of a contrast and a chroma of the images at a time the determining unit determines that the field area at the time of imaging has been changed. A display device according to another aspect of the present invention includes: an image processing device including a determining unit configured to determine, in accordance with two images corresponding to temporally adjacent image data input from an external device, whether or not a field area at a time of imaging has been changed, and a suppressing unit configured to generate and output suppressed image data with an amount of visually recognizable information included in the images being suppressed by performing image processing of reducing at least one of a contrast and a chroma of the images at a time the determining unit determines that the field area at the time of imaging has been changed; and a display unit configured to display a suppressed image corresponding to the suppressed image data generated by the suppressing unit.

An imaging device according to still another aspect of the present invention includes: an imaging unit configured to continuously image a field area and sequentially generate a plurality of image data; an image processing device including a determining unit configured to determine, in accordance with two images corresponding to temporally adjacent image data input from the imaging unit, whether or not the field area at a time of imaging has been changed, and a suppressing unit configured to generate and output suppressed image data with an amount of visually recognizable information included in the images being suppressed by performing image processing of reducing at least one of a contrast and a chroma of the images at a time the determining unit determines that the field area at the time of imaging has been changed; and a display unit configured to display a suppressed image corresponding to the suppressed image data generated by the suppressing unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9A and FIG. 9B are diagrams illustrating another example of the image when the determining unit of the imaging apparatus according to the first embodiment of the present invention performs determination;

FIG. 10 is a diagram illustrating another example of the image displayed by the display unit of the imaging apparatus according to the first embodiment of the present invention;

FIG. 20A and FIG. 20B are diagrams schematically illustrating a relation between position and amount of information in a preceding image generated by an imaging unit of an imaging apparatus according to a modified example of the second embodiment of the present invention;

FIG. 21A and FIG. 21B are diagrams schematically illustrating a relation between position and amount of information in a latest image generated by the imaging unit of the imaging apparatus according to the modified example of the second embodiment of the present invention;

FIG. 25 is a flow chart illustrating an outline of a process executed by the imaging apparatus according to the third embodiment of the present invention;

FIG. 28A to FIG. 28D are diagrams illustrating another example of the image displayed by the display unit of the imaging apparatus according to the third embodiment of the present invention.

DETAILED DESCRIPTION OF THE PREFERRED EMBODIMENTS

Figure 1:
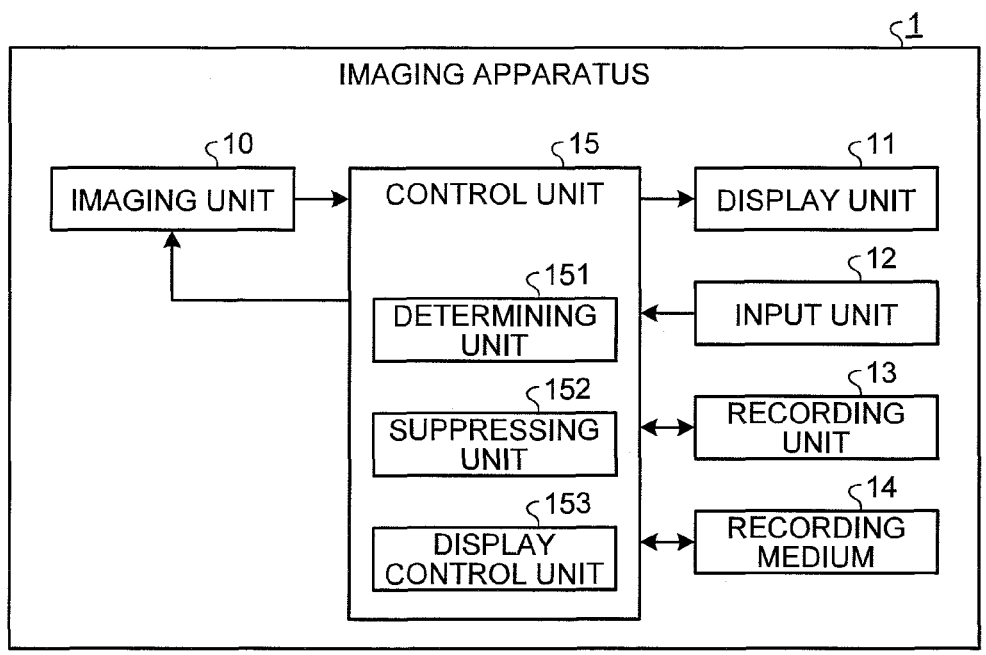
FIG. 1 is a block diagram illustrating a functional configuration of an imaging apparatus according to a first embodiment of the present invention.

Hereinafter, with reference to the drawings, modes for carrying out the present invention (hereinafter, referred to as "embodiments") will be described. Further, hereinafter, as examples, an imaging apparatus equipped with an image processing device and a display device of the present invention will be described. The present invention is not limited by the following embodiments. Further, in the drawings, illustration is made by appending the same reference signs to the same portions.

First Embodiment

FIG. 1 is a block diagram illustrating a functional configuration of an imaging apparatus according to a first embodiment of the present invention. An imaging apparatus 1 illustrated in FIG. 1 at least includes an imaging unit 10, a display unit 11, an input unit 12, a recording unit 13, a recording medium 14, and a control unit 15.

Under control by the control unit 15, the imaging unit 10 continuously shoots a predetermined field area and generate a plurality of image data (moving image data) that are temporally continuous. The imaging unit 10 is configured by using: an optical system, which is configured of a plurality of lenses and forms a subject image; a diaphragm, which adjusts light quantity of the optical system; an imaging element, such as a charge coupled device (CCD) or complementary metal oxide semiconductor (CMOS), which generates image data by optically receiving and photoelectrically converting the subject image formed by the optical system; a shutter, which sets a state of the imaging element to an exposed state or a shaded state; a signal processing unit, which performs predetermined analog processing on the image data generated by the imaging element; an A/D converter, which generates and outputs to the control unit 15, digital image data, by performing A/D conversion on analog image data input from the signal processing unit; and a timing generator, which generates imaging timing of the imaging element.

The display unit 11 displays, under control by the control unit 15, an image corresponding to the image data generated by the imaging unit 10. The displaying of images includes: REC view display of displaying an image corresponding to image data immediately after shooting for only a predetermined period of time (for example, for three seconds); playback display of displaying a playback image corresponding to image data recorded in the recording medium 14; live view image display of sequentially displaying live view images corresponding to image data continuously generated by the imaging unit 10; and the like. The display unit 11 is configured by using: a display panel made of a liquid crystal or organic electroluminescence (EL); a driver; and the like. In this first embodiment, the display unit 11 and the later described control unit 15 function as a display device.

The input unit 12 receives inputs of instruction signals instructing various operations related to the imaging apparatus 1. The input unit 12 is configured by using a power switch that switches over a power state of the imaging apparatus 1 to an ON state or an OFF state, a release switch that receives an input of a release signal giving an instruction to shoot a still image to the imaging apparatus 1, a moving image switch that receives an input of an instruction signal instructing the imaging apparatus 1 to shoot a moving image, and the like.

The recording unit 13 records therein image data input via the control unit 15, information being processed by the imaging apparatus 1, various programs for operating the imaging apparatus 1, a program according to this first embodiment, various data to be used during execution of the programs, and the like. The recording unit 13 is configured by using a synchronous dynamic random access memory (SDRAM), a Flash memory, and the like.

The recording medium 14 records therein image data input via the control unit 15. The recording medium 14 is configured by using a memory card or the like, which is inserted from outside of the imaging apparatus 1, and is detachably inserted in the imaging apparatus 1 via a memory I/F not illustrated. Image data or moving image data processed by the later described control unit 15 are written into the recording medium 14. Further, the recorded image data or moving image data are read out from the recording medium 14 by the control unit 15.

The control unit 15 comprehensively controls operations of the imaging apparatus 1 by performing transfer or the like of instructions and data to and from the respective units forming the imaging apparatus 1. The control unit 15 is configured by using a central processing unit (CPU). In this first embodiment, the control unit 15 functions as an image processing device.

A detailed configuration of the control unit 15 will be described. The control unit 15 has a determining unit 151, a suppressing unit 152, and a display control unit 153.

The determining unit 151 determines whether or not a field area of the imaging unit 10 has changed. Specifically, the determining unit 151 determines, based on a coincidence between two images corresponding to temporally adjacent image data generated by the imaging unit 10, whether or not the field area of the imaging unit 10 has changed. For example, the determining unit 151 determines, by performing motion determination with respect to the two images corresponding to the temporally adjacent image data generated by the imaging unit 10, a motion caused in the imaging apparatus 1, for example, a panning operation, a tilting operation, or another shooting screen changing operation by a user.

If the determining unit 151 determines that the field area of the imaging unit 10 has changed, the suppressing unit 152 generates suppressed image data with an amount of visually recognizable information being suppressed, the information being included in an image corresponding to image data generated by the imaging unit 10, and outputs the suppressed image data to the display control unit 153 or an external device (for example, an image display device, or the like). Specifically, the suppressing unit 152 generates the suppressed image data by performing image processing of reducing any one or more of a contrast, a chroma, a resolution, a pixel number, and the like, which is shooting information visually recognizable and included in the image generated by the imaging unit 10. Of course, since visual recognizability may be influenced by how a person's eyes are used, if the suppressing unit 152 uses another representation, the suppressing unit 152 may carry out a process of suppressing an amount of spatial change or an amount of temporal change (this becoming smaller in association with a decrease in the spatial change) of data upon display of information, or an amount of data upon recording.

Further, the suppressing unit 152 may decrease a pixel number or decrease a data change among pixels, and is able to obtain similar effects by a process of decreasing a change in an amount of information of each pixel. For example, if an emitting type display element, such as of a liquid crystal, is viewed in the bright open air or the like, visibility is decreased with natural light being superimposed thereon, but even if brightness is provided like this by giving an offset as a whole, a change in the image is decreased and flickering becomes hard to be seen, and of course, even if image data are increased correspondingly with the offset like this, the suppressing unit 152 is able to obtain the aimed results of the present embodiment. Further, the change being small corresponds to a process decreasing the data amount, and thus is in an advantageous direction recording-time-wise and volume-wise. An effect of the perception not being suppressed even if the motion of an image on the retina is fierce when the eyeball movement is quick (saccade) is called saccade suppression in the physiological field, and an approach of the present invention is to have an aspect of attempting to support this suppression effect at the device side too. Of course, even without the eyeball movement, there is also an image representation leading to unpleasantness, discomfort, or decrease in quality and this is also dealt with by the present embodiment. This amount of change may be determined with an image change over a difference of about $\frac{1}{10}$ second, judging from the reaction speed of the eyes of humans, and for a frame rate of $\frac{1}{30}$ second, $\frac{1}{60}$ second, or the like, detection may be performed with the change over the number of frames corresponding thereto.

The display control unit 153 causes the display unit 11 to display an image corresponding to image data generated by the imaging unit 10. Further, if the determining unit 151 determines that the field area of the imaging unit 10 has changed, the display control unit 153 causes the display unit 11 to display a suppressed image corresponding to the suppressed image data generated by the suppressing unit 152. Furthermore, the display control unit 153 causes the display unit 11 to display operational information related to the imaging apparatus 1. In this first embodiment, the display control unit 153 functions as an output unit that outputs the suppressed image data generated by the suppressing unit 152 to the display unit 11.

Figure 2:
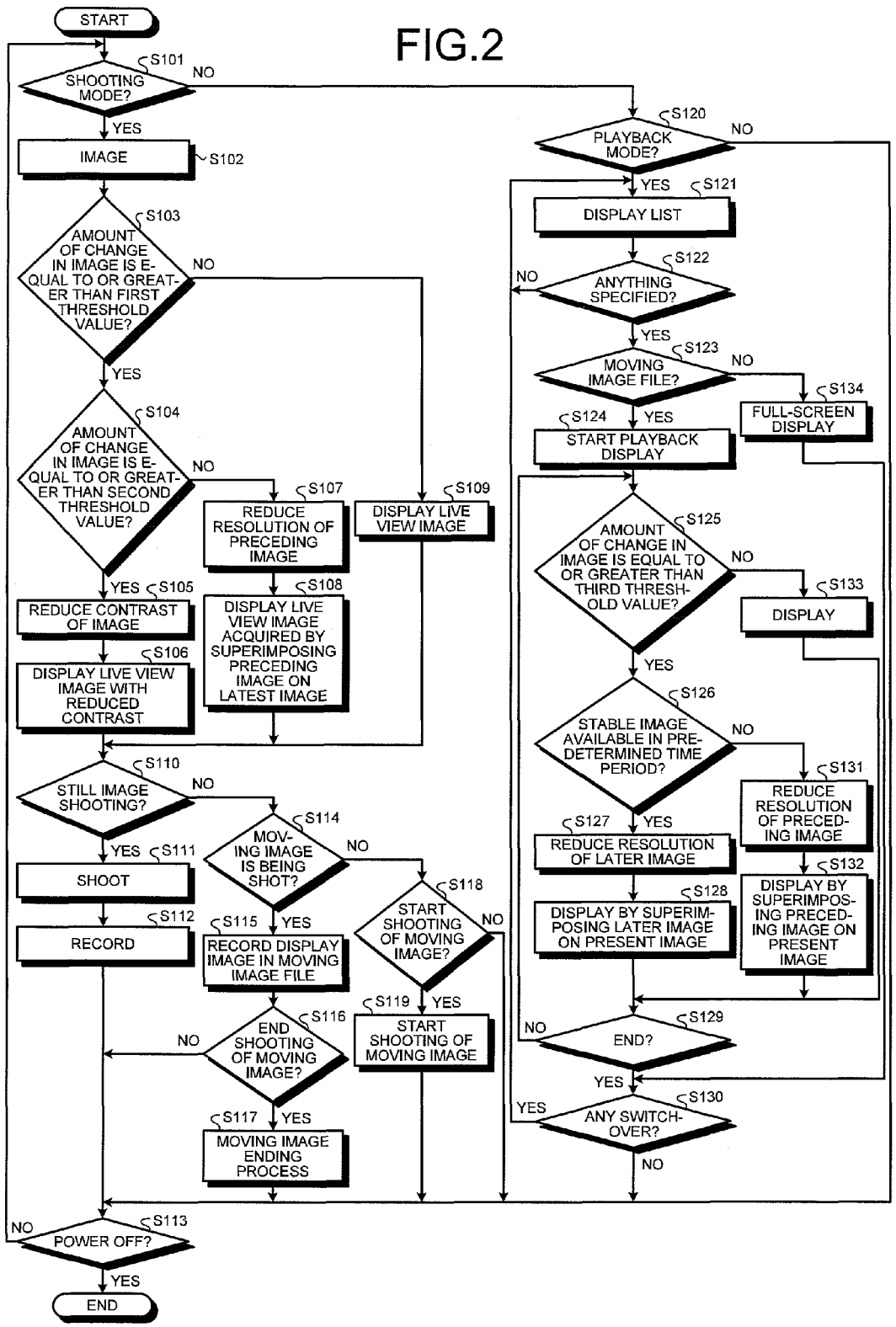
FIG. 2 is a flow chart illustrating an outline of a process executed by the imaging apparatus according to the first embodiment of the present invention.

A process executed by the imaging apparatus 1 having the above configuration will be described. FIG. 2 is a flow chart illustrating an outline of the process executed by the imaging apparatus 1.

As illustrated in FIG. 2, first, a case where the imaging apparatus 1 has been set in shooting mode (Step S101: Yes) will be described. In this case, the control unit 15 causes the imaging unit 10 to execute shooting (Step S102).

Subsequently, the determining unit 151 determines whether or not an amount of change between two images (hereinafter, simply referred to as "two temporally adjacent images") corresponding to image data, which have been generated by the imaging unit 10 and which are temporally adjacent to each other, is equal to or greater than a first threshold value (Step S103). This amount of change may be determined as a change in a distribution of brightness of the image or in the brightness itself, and like a motion vector, may be determined by analyzing how the change has progressed, but in any case, the threshold value is supposed to be increased when the change is large.

Figure 3:
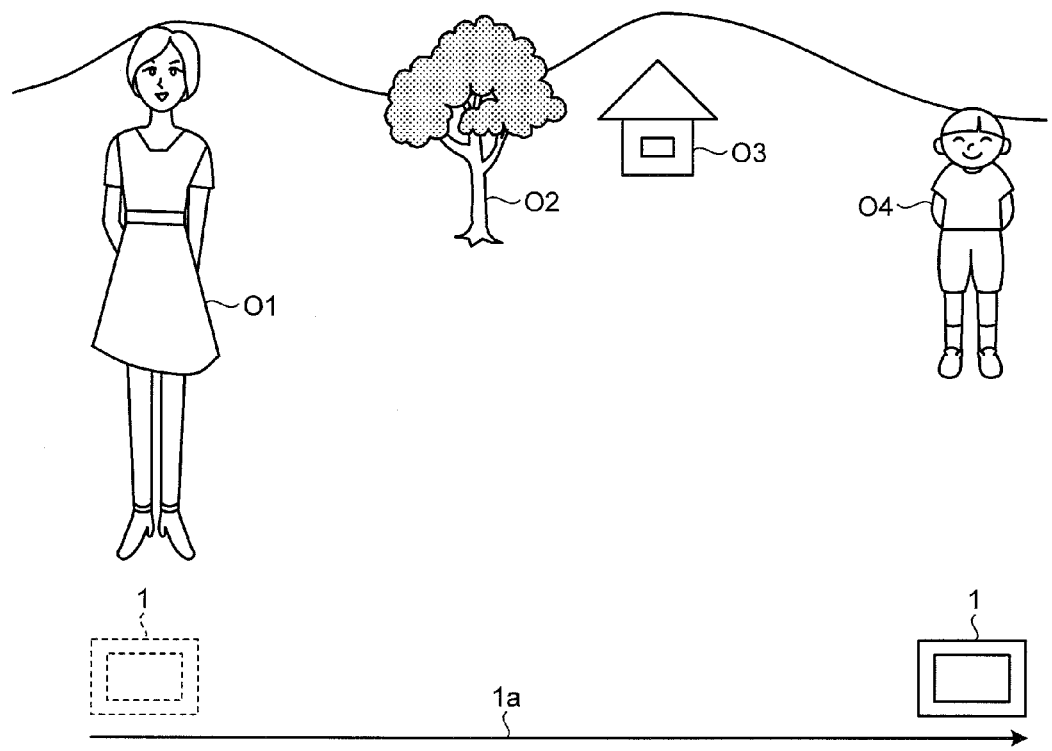
FIG. 3 is a diagram illustrating a situation where a user performs a panning operation on the imaging apparatus according to the first embodiment of the present invention.
Figure 4:
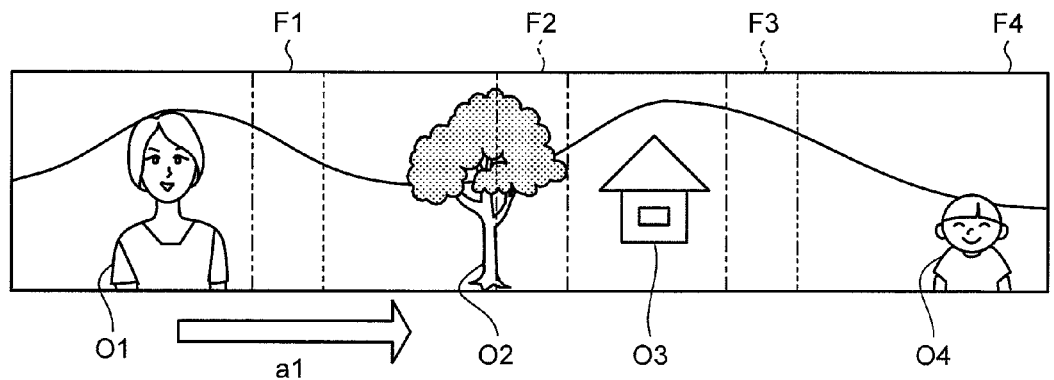
FIG. 4 is a diagram schematically illustrating a field area shot by the imaging apparatus under the situation of FIG. 3.

FIG. 3 is a diagram illustrating a situation where a user performs a panning operation on the imaging apparatus 1. FIG. 4 is a diagram schematically illustrating a field area imaged by the imaging apparatus 1 under the situation of FIG. 3. FIG. 3 and FIG. 4 illustrate the situation where between a field area including a subject 01 and a field area including a subject 04 is continuously imaged, by the imaging apparatus 1 moving in an approximately horizontal direction (arrow a1) by the panning operation of the user on the imaging apparatus 1. Further, images F1 to F4 of FIG. 4 correspond to images of field areas imaged by the movement of the imaging apparatus 1. Furthermore, with reference to FIG. 3, a case where the user performs the panning operation of moving the imaging apparatus 1 in the approximately horizontal direction at a constant velocity is described.

Figure 5A:
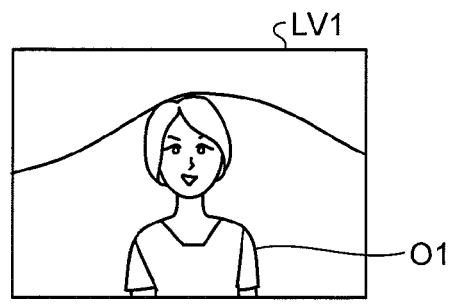
FIG. 5A and FIG. 5B are diagrams illustrating an example of an image when a determining unit of the imaging apparatus according to the first embodiment of the present invention performs determination.
Figure 5B:
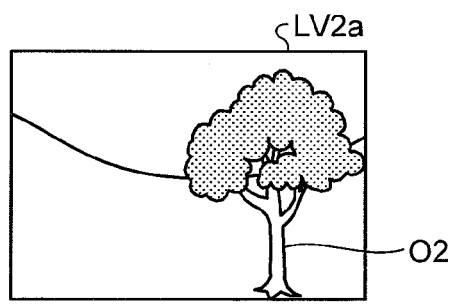

As illustrated in FIG. 3 and FIG. 4, the determining unit 151 determines whether or not the amount of change between the two temporally adjacent images generated by the imaging unit 10 is equal to or greater than the first threshold value when the imaging apparatus 1 performs the panning operation by the user. Specifically, the determining unit 151 calculates, as the amount of change between the two images, an amount of change in image information, for example, brightness information (brightness or hue) by performing pattern matching for each pixel, and determines whether or not a result of this calculation is equal to or greater than the first threshold value. More specifically, as illustrated in FIG. 5A and FIG. 5B, the determining unit 151 calculates, for each pixel, a coincidence between a latest image LV2a (corresponding to the field area of the image F2 of FIG. 4) and a preceding image LV1 (corresponding to the field area of the image F1 of FIG. 4), which have been generated by the imaging unit 10 and which are the two temporally adjacent to each other, and determines whether or not the amount of change of the latest image LV2a with respect to the preceding image LV1 is equal to or greater than the first threshold value, for example, whether or not ¾ or more of the field area of the imaging unit 10 has changed. In FIGS. 5A and 5B, although the first threshold value is set to be equal to or greater than ¾ of the field area of the imaging unit 10, for example, it may be set to be equal to or greater than half or equal to or greater than ⅔ of the field area of the imaging unit 10 and may be changed as appropriate. Of course, according to the shot scene, for example, a night view, a portrait, a landscape, or a subject, the first threshold value may be changed. Further, this may be changed according to the environment upon viewing. That is, when it is bright, the contrast of a displayed image appears to be reduced, and when it is dark, the contrast is clear and may cause extra discomfort. That is, in such a case, the supposed display playback environment maybe supposed and changed.

At Step S103, if the determining unit 151 determines that the amount of change between the two temporally adjacent images generated by the imaging unit 10 is equal to or greater than the first threshold value (Step S103: Yes), the imaging apparatus 1 proceeds to later described Step S104.

Figure 6A:
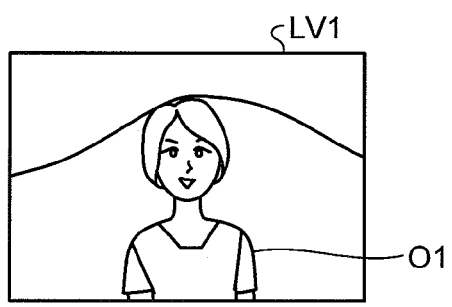
FIG. 6A and FIG. 6B are diagrams illustrating another example of the image when the determining unit of the imaging apparatus according to the first embodiment of the present invention performs determination.
Figure 6B:
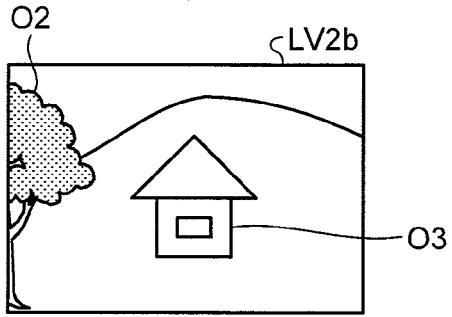

Subsequently, the determining unit 151 determines whether or not the amount of change between the two temporally adjacent images generated by the imaging unit 10 is equal to or greater than a second threshold value (Step S104). Specifically, the determining unit 151 calculates, as the change in amount between the two images, a difference or an amount of change in image information for each pixel or for each divided area (for each block) acquired by division into a predetermined area, and determines whether or not a result of this calculation is equal to or greater than the second threshold value. More specifically, as illustrated in FIG. 6A and FIG. 6B, the determining unit 151 calculates, for each pixel or for each area, a coincidence between a latest image LV2b (corresponding to the field area of the image F3 of FIG. 4) and the preceding image LV1, which have been generated by the imaging unit 10 and are the two temporally adjacent to each other, and determines whether or not the amount of change of the latest image LV2b from the preceding image LV1 is equal to or greater than the second threshold value, for example, whether or not ⅘ or more of the field area of the imaging unit 10 has changed. In FIGS. 6A and 6B, the second threshold value just needs to be set to be larger than the first threshold value. Further, the determining unit 151 determines that the amount of change is equal to or greater than the second threshold value if the preceding image no longer has no field area to be superimposed on the latest image, for the two temporally adjacent images generated by the imaging unit 10. This second threshold value may be changed under the shooting environment, and this may be changed according to the environment upon playback viewing. That is, when it is bright, the contrast of a displayed image appears to be reduced, and when it is dark, the contrast is clear and may cause extra discomfort. Accordingly, in such a case, the threshold value may be changed by supposing the supposed display playback environment.

At Step S104, if the determining unit 151 determines that the amount of change between the two temporally adjacent images generated by the imaging unit 10 is equal to or greater than the second threshold value (Step S104: Yes), the imaging apparatus 1 proceeds to Step S105.

Subsequently, the suppressing unit 152 performs image processing of reducing a contrast of the latest image corresponding to the latest image data generated by the imaging unit 10, and generates suppressed image data with the amount of visually graspable information being suppressed (Step S105). The suppressing unit 152 may perform image processing of reducing the chroma or brightness (brightness or gain) instead of the contrast. Further, the suppressing unit 152 may perform image processing combining two or more of the contrast, chroma, and brightness to generate suppressed image data with the amount of information being suppressed. A change in an image in a screen is decreased also when the image is reduced, a peripheral portion is blurred, or a frame is provided. If an offset signal is caused to be included in the entire part thereof as described above, the image change is decreased, and the eyestrain and discomfort tend to be decreased. Such image quality adjustment may be performed upon shooting but may be performed upon playback, and thus an image change suppressing signal may just be given.

Figure 7:
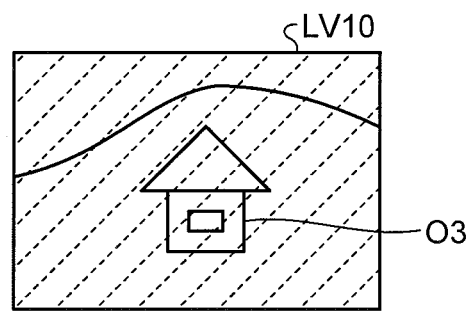
FIG. 7 is a diagram illustrating an example of an image displayed by a display unit of the imaging apparatus according to the first embodiment of the present invention.

Subsequently, the display control unit 153 causes the display unit 11 to display a live view image corresponding to the suppressed image data with the reduced contrast generated by the suppressing unit 152 (Step S106). Specifically, as illustrated in FIG. 7, the display control unit 153 causes the display unit 11 to display a live view image LV10 corresponding to the suppressed image data with the reduced contrast generated by the suppressing unit 152. Thereby, when the user performs the panning operation on the imaging apparatus 1, the contrasts of various subjects 02 and 03 taken between the present subject 01 and the desired subject 04 are reduced to suppress the amount of information visually recognizable in the image upon the panning operation, and thus even if a field area is drastically changed upon moving image shooting or moving image playback, a user is able to perform visual recognition comfortably. In FIG. 7, the reduction in contrast is represented by hatching. After step S106, the imaging apparatus 1 proceeds to later described step S110.

At Step S104, if the determining unit 151 determines that the amount of change between the two temporally adjacent images generated by the imaging unit 10 is not equal to or greater than the second threshold value (Step S104: No), the imaging apparatus 1 proceeds to Step S107.

Subsequently, the suppressing unit 152 performs image processing of reducing a resolution of the preceding image corresponding to the preceding image data generated by the imaging unit 10 to generate suppressed image data (Step S107). The suppressing unit 152 may generate the suppressed image data by decimating compressibility or pixels, instead of the resolution of the preceding image corresponding to the preceding image data generated by the imaging unit 10.

Figure 8:
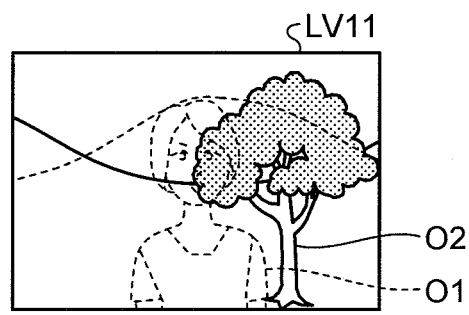
FIG. 8 is a diagram illustrating another example of the image displayed by the display unit of the imaging apparatus according to the first embodiment of the present invention.

Thereafter, the display control unit 153 causes the display unit 11 to display a live view image with the preceding image corresponding to the suppressed image data with the reduced resolution generated by the suppressing unit 152 being superimposed on the latest image (Step S108). Specifically, as illustrated in FIG. 8, the display control unit 153 causes the display unit 11 to display a live view image LV11 with the preceding image corresponding to the suppressed image data with the reduced resolution generated by the suppressing unit 152 being superimposed on the latest image. Thereby, when the user performs the panning operation on the imaging apparatus 1, since the preceding images imaged between the subject 01 to the desired subject 04 are sequentially caused to be afterimages and the amount of information visually recognizable in the image upon the panning operation is suppressed, even if a field area upon moving image shooting is changed, a user is able to perform visual recognition comfortably upon moving image playback. In FIG. 8, the afterimage is represented by dotted lines. After step S108, the imaging apparatus 1 proceeds to step S110.

At Step S103, if the determining unit 151 determines that the amount of change between the two temporally adjacent images generated by the imaging unit 10 is not equal to or greater than the first threshold value (Step S103: No), the imaging apparatus 1 proceeds to Step S109. For example, in the case illustrated in FIG. 9A and FIG. 9B, the determining unit 151 calculates a coincidence between a latest image LV2c (corresponding to the field area of the image F1 of FIG. 4) and the preceding image LV1, which have been generated by the imaging unit 10 and are the two temporally adjacent to each other, and determines that the amount of change of the latest image LV2c with respect to the preceding image LV1 is not equal to or greater than the first threshold value. Specifically, as illustrated in FIG. 9A and FIG. 9B, if the field area of the imaging unit 10 has not changed substantially, the amount of change between the two temporally adjacent images is determined to be not equal to or greater than the first threshold value.

Subsequently, the display control unit 153 causes the display unit 11 to display a live view image corresponding to the latest image data generated by the imaging unit 10 (Step S109). Specifically, as illustrated in FIG. 10, the display control unit 153 causes the display unit 11 to display a live view image LV12 corresponding to the latest image data generated by the imaging unit 10. After step S109, the imaging apparatus 1 proceeds to step S110.

After Step S106, Step S108, and Step S109, if an instruction signal instructing still image shooting is input via the input unit 12 (Step S110: Yes), the control unit 15 causes the imaging unit 10 to execute shooting and records image data generated by the imaging unit 10 in the recording medium 14 (Step S112).

Subsequently, if the power of the imaging apparatus 1 is turned OFF via the input unit 12 (Step S113: Yes), the imaging apparatus 1 ends this process. In contrast, if the power of the imaging apparatus 1 has not been turned OFF via the input unit 12 (Step S113: No), the imaging apparatus 1 returns to Step S101.

At Step S110, if the instruction signal instructing still image shooting has not been input via the input unit 12 (Step S110: No), the imaging apparatus 1 proceeds to Step S114.

Subsequently, if the imaging apparatus 1 is shooting a moving image (Step S114: Yes), the control unit 15 records image data corresponding to a displayed image displayed by the display unit 11 into a moving image file of the recording medium 14 (Step S115).

Thereafter, if an instruction signal to end the moving image shooting is input via the input unit 12 (Step S116: Yes), the control unit 15 executes a moving image ending process to end the moving image shooting of the imaging apparatus 1 (Step S117). For example, the control unit 15 records information indicating a moving image time and a data amount of the moving image file of the recording medium 14 as meta information. After step S117, the imaging apparatus 1 proceeds to step S113.

At Step S116, if the instruction signal to end the moving image shooting has not been input via the input unit 12 (Step S116: No), the imaging apparatus 1 proceeds to Step S113.

At Step S114, if the imaging apparatus 1 is not shooting a moving image (Step S114: No), the imaging apparatus 1 proceeds to Step S118.

Subsequently, if the instruction signal to start the moving image shooting has been input via the input unit 12 (Step S118: Yes), the control unit 15 starts the moving image shooting of the imaging apparatus 1 (Step S119). Specifically, the control unit 15 generates a moving image file for recording image data sequentially generated by the imaging unit 10 along a time series in the recording medium 14. After step S119, the imaging apparatus 1 proceeds to step S113.

At Step S118, if the instruction signal to start the moving image shooting has not been input via the input unit 12 (Step S118: No), the imaging apparatus 1 proceeds to Step S113.

Next, a case where the imaging apparatus 1 has not been set in shooting mode in Step S101 (Step S101: No) will be described. In this case, if the imaging apparatus 1 has been set in playback mode (Step S120: Yes), the display control unit 153 causes the display unit 11 to display a list of thumbnail images recorded in respective headers of image files or moving image files recorded in the recording medium 14 (Step S121).

Subsequently, if an image file to be played back has been specified via the input unit 12 from the list of images displayed by the display unit 11 (Step S122: Yes), the imaging apparatus 1 proceeds to Step S123. On the contrary, if an image file to be played back has not been specified via the input unit 12 from the list of images displayed by the display unit 11 (Step S122: No), the imaging apparatus 1 returns to Step S121.

At Step S123, if the image file specified via the input unit 12 is a moving image file (Step S123: Yes), the display control unit 153 starts playback display of a moving image corresponding to moving image data recorded in the moving image file (Step S124).

Subsequently, the determining unit 151 determines whether or not an amount of change between two temporally adjacent images is equal to or greater than a third threshold value (Step S125). Specifically, the determining unit 151 determines whether the amount of change between the latest image and the preceding image displayed by the display unit 11 is equal to or greater than the third threshold value. If the determining unit 151 determines that the amount of change between the two temporally adjacent images is equal to or greater than the third threshold value (Step S125: Yes), the imaging apparatus 1 proceeds to Step S126. On the contrary, if the determining unit 151 determines that the amount of change between the two temporally adjacent images is not equal to or greater than the third threshold value (Step S125: No), the imaging apparatus 1 proceeds to later described Step S133.

At Step S126, if there is a stable image with the amount of change in the image being stabilized within a predetermined time period from the present image being displayed by the display unit 11 (Step S126: Yes), the suppressing unit 152 executes a suppressing process of reducing a resolution of the stable image (Step S127).

Subsequently, the display control unit 153 superimposes the stable image with the resolution reduced by the suppressing unit 152 on the present image and causes the display unit 11 to display the superimposed images (Step S128). Thereby, a user is able to be provided with comfort by the advance noticing effect.

Thereafter, if the moving image has ended (Step S129: Yes), the imaging apparatus 1 proceeds to later described Step S130. On the contrary, if the moving image has not ended (Step S129: No), the imaging apparatus 1 returns to Step S125.

At Step S130, if a switch-over of images to be played back has been input via the input unit 12 (Step S130: Yes), the imaging apparatus 1 returns to Step S121. On the contrary, if the switch-over of images to be played back has not been input via the input unit 12 (Step S130: No), the imaging apparatus 1 proceeds to Step S113.

At Step S126, if there is no stable image with the amount of change in the image being stabilized within the predetermined time period from the present image being displayed by the display unit 11 (Step S126: No), the imaging apparatus 1 proceeds to Step S131.

Subsequently, the suppressing unit 152 executes a suppressing process of reducing a resolution of the preceding image (Step S131).

Thereafter, the display control unit 153 superimposes the preceding image with the resolution reduced by the suppressing unit 152 on the present image and causes the display unit 11 to display the superimposed images (Step S132). After Step S132, the imaging apparatus 1 proceeds to Step S129.

At Step S133, the display control unit 153 causes the display unit 11 to display an image corresponding to image data (Step S133). After Step S133, the imaging apparatus 1 proceeds to Step S129.

At Step S123, if the image file specified via the input unit 12 is not a moving image file (Step S123: No), the display control unit 153 causes the display unit 11 to perform full-screen display of an image corresponding to the image data (Step S134). After Step S134, the imaging apparatus 1 proceeds to Step S130.

At Step S120, if the imaging apparatus 1 has not been set in playback mode (Step S120: No), the imaging apparatus 1 proceeds to Step S113.

According to the above described first embodiment of the present invention, even if a field area drastically changes due to a panning operation, a tilting operation, or another shooting screen changing operation upon moving image shooting, a user is able to comfortably perform visual recognition upon playback of a moving image.

Further, according to the first embodiment of the present invention, if the determining unit 151 determines that the field area of the imaging unit 10 has changed, the suppressing unit 152 generates the suppressed image data with the amount of visually recognizable information included in the image corresponding to the image data generated by the imaging unit 10 being suppressed, and the display control unit 153 causes the display unit 11 to display the live view image corresponding to the suppressed image data generated by the suppressing unit 152. Thereby, the latest image with a large inter-frame change is displayed by the display unit 11 with the amount of change from the preceding image being decreased, and thus a user is able to comfortably perform visual recognition upon moving image shooting or playback of a moving image. Such a process of suppressing an amount of visually recognizable information (that is, a process of suppressing an amount of spatial change or an amount of temporal change, of data upon displaying of information) does not need to be performed uniformly, and the process may be changed between the start of the panning and during the panning or the process may be changed according to the severity of the image change upon the panning.

The above described first embodiment of the present invention is applied to the case where the panning operation of moving the imaging apparatus 1 in the approximately horizontal direction is performed by the user, but it may also be applied to a case where a tilting operation of moving the imaging apparatus 1 in an approximately vertical direction is performed by a user or to another shooting screen changing operation.

Further, in the first embodiment of the present invention, when the live view image is displayed, the suppressing unit 152 decreases the amount of visually recognizable information included in the image corresponding to the image data generated by the imaging unit 10, but for example, suppression of an amount of information may be performed only with respect to image data recorded in the recording medium 14.

Further, in the first embodiment of the present invention, by using the two temporally adjacent images, the determining unit 151 determines whether or not the field area of the imaging unit 10 has changed, but the images are not necessarily temporally adjacent to each other, and whether or not the field area of the imaging unit 10 has changed may be determined between predetermined frames, for example, by using odd numbered frames or even numbered frames of the image data generated by the imaging unit 10.

Second Embodiment

Next, a second embodiment of the present invention will be described. An imaging apparatus according to this second embodiment has a different configuration and executes a different process, from the above described imaging apparatus according to the first embodiment. Therefore, hereinafter, after describing the configuration of the imaging apparatus according to this second embodiment, the process executed by the imaging apparatus according to this second embodiment will be described. The same signs will be appended to structural components that are the same as those of the above described imaging apparatus according to the first embodiment and description thereof will be omitted. However, needless to say, repetition of any blocks and functional components working similarly and corresponding herein to those already described is just omitted, and the blocks and functional components are able to be adapted as they are.

Figure 11:
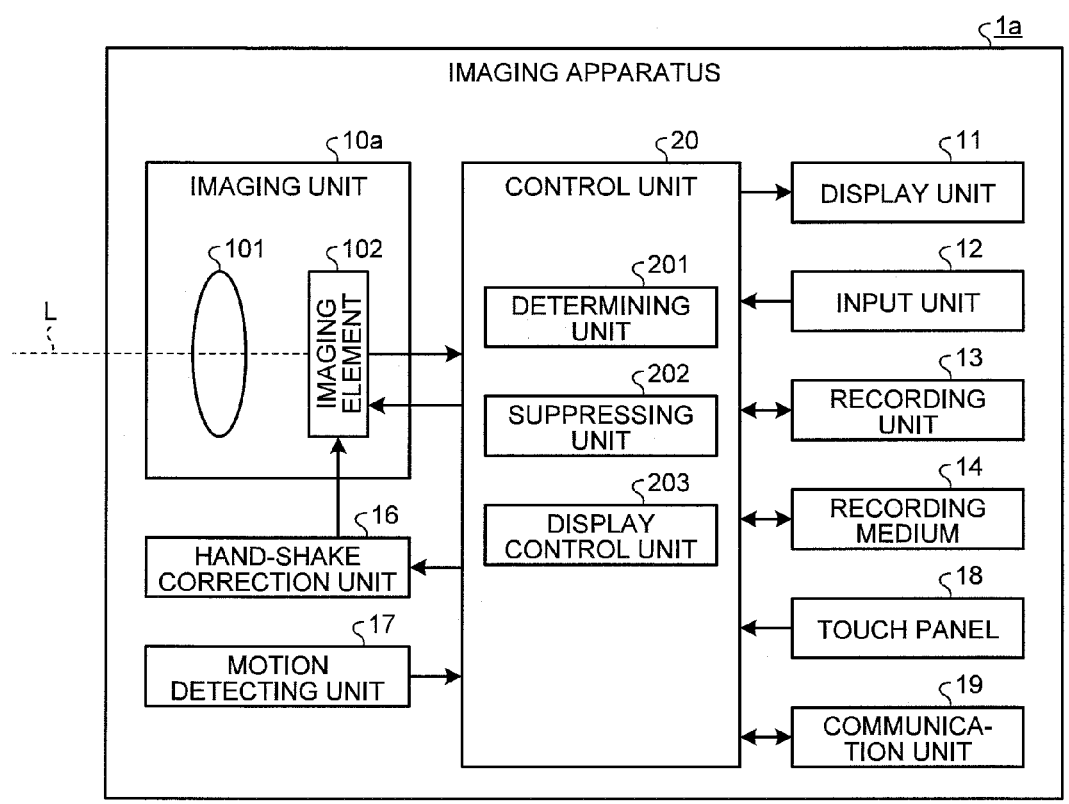
FIG. 11 is a block diagram illustrating a functional configuration of an imaging apparatus according to a second embodiment of the present invention.

FIG. 11 is a block diagram illustrating a functional configuration of the imaging apparatus according to the second embodiment of the present invention. An imaging apparatus 1a illustrated in FIG. 11 includes an imaging unit 10a, the display unit 11, the input unit 12, the recording unit 13, the recording medium 14, a hand-shake correction unit 16, a motion detecting unit 17, a touch panel 18, a communication unit 19, and a control unit 20.

The imaging unit 10a has: a lens unit 101, which is configured by using a plurality of lenses, condenses light from a predetermined field area, and forms a subject image of a subject; and an imaging element 102, which receives the subject image formed by the lens unit 101 and generates image data of the subject. The imaging element 102 continuously generates the image data of the subject and outputs the image data to the control unit 20.

The hand-shake correction unit 16 corrects hand-shake caused in the imaging apparatus 1a. Specifically, the hand-shake correction unit 16 moves the imaging element 102 in a vertical plane orthogonal to an optical axis "L" of the imaging unit 10a and moves the imaging element 102 in a horizontal plane orthogonal to the optical axis "L", to thereby correct the hand-shake caused in the imaging apparatus 1a (intra-body hand-shake correction). The hand-shake correction unit 16 is configured by using a plurality of ultrasonic actuators and an actuator driving unit. Under control by the control unit 20, the hand-shake correction unit 16 moves the imaging element 102 in the vertical plane and the horizontal plane. Instead of the imaging element 102, the hand-shake correction unit 16 may move the lens unit 101 in the vertical plane or the horizontal plane to thereby correct the hand-shake caused in the imaging apparatus 1a (intra-lens hand-shake correction).

The motion detecting unit 17 detects a motion caused in the imaging apparatus 1a and outputs a result of this detection to the control unit 20. Specifically, the motion detecting unit 17 detects each of an acceleration and an angular velocity caused in the imaging apparatus 1a and outputs a result of this detection to the control unit 20. The motion detecting unit 17 is configured by using an acceleration sensor, a gyro sensor, and the like.

The touch panel 18 is provided superimposed on a display screen of the display unit 11. The touch panel 18 detects a touch by an external object, and outputs a position signal corresponding to a position of this detected touch to the control unit 20. Further, the touch panel 18 may detect a position touched by a user based on information displayed by the display unit 11, for example, an icon image or a thumbnail image, and may receive, according to this detected touch position, an input of an instruction signal for instructing an operation to be performed by the imaging apparatus 1a or a selection signal for selecting an image. In general, types of the touch panel 18 include a resistive film type, an electrostatic capacitance type, an optical type, and the like. In this second embodiment, any type of touch panel is applicable.

The communication unit 19 performs wireless communication with an external device and transmits or receives an image file including image data, according to predetermines wireless communication standards. The predetermined wireless communication standards are IEEE 802.11b, IEEE 802.11n, and the like. In this second embodiment, any wireless communication standards are applicable. Further, the communication unit 19 is configured by using a communication device for performing bidirectional communication of various information, such as an image file and contents data, with the external device via a network. The communication device is configured of an antenna that transmits and receives a radio signal to and from another device, a transmitting and receiving circuit that performs a demodulation process on the signal received by the antenna and a modulation process on a signal transmitted, and the like. Further, the communication unit 19 periodically transmits a communication signal including identification information (device ID) informing a presence thereof when the imaging apparatus 1a is activated. The communication unit 19 may be provided in the recording medium 14, such as a memory card, which is inserted from outside of the imaging apparatus 1a. Furthermore, the communication unit 19 may be provided in an accessory attached to the imaging apparatus 1a via a hot shoe.

The control unit 20 performs transfer or the like of instructions and data corresponding to the respective units forming the imaging apparatus 1a and comprehensively controls operations of the imaging apparatus 1a. The control unit 20 is configured by using a CPU or the like. In this second embodiment, the control unit 20 functions as an image processing device.

A detailed configuration of the control unit 20 will now be described. The control unit 20 has a determining unit 201, a suppressing unit 202, and a display control unit 203.

The determining unit 201 superimposes the latest image and a preceding image immediately therebefore corresponding to temporally adjacent image data generated by the imaging unit 10a onto each other and determines a difference therebetween for each pixel, to thereby determine whether or not the field area of the imaging unit 10a has changed. Specifically, the determining unit 201 sums up differences between respective pixel values of image central positions of the latest image and the preceding image, sums up differences between respective pixel values of image peripheral portions of the latest image and the preceding image, and if a value acquired by summing up the respective differences of the image central portions and the image peripheral portions is equal to or greater than a predetermined threshold value, determines that the field area of the imaging unit 10a has changed. The image central portion is $2/3$ of the area and includes the center of the image. Further, the image peripheral portion is an area excluding the image central portion.

If the determining unit 201 determines that the field area of the imaging unit 10a has changed, the suppressing unit 202 generates suppressed image data with the amount of visually recognizable information included in an image corresponding to image data generated by the imaging unit 10a being suppressed. Specifically, the suppressing unit 202 generates the suppressed image data by performing image processing of reducing any one or more of a contrast, a chroma, a resolution, a pixel number, and the like, which is shooting information visually recognizable and included in the image generated by the imaging unit 10.

The display control unit 203 causes the display unit 11 to display the image corresponding to the image data generated by the imaging unit 10a. Further, if the determining unit 201 determines that the field area of the imaging unit 10a has changed, the display control unit 203 causes the display unit 11 to display a suppressed image corresponding to the suppressed image data generated by the suppressing unit 202. Furthermore, the display control unit 203 causes the display unit 11 to display operational information related to the imaging apparatus 1a. In this second embodiment, the display control unit 203 functions as an output unit.

Figure 12:
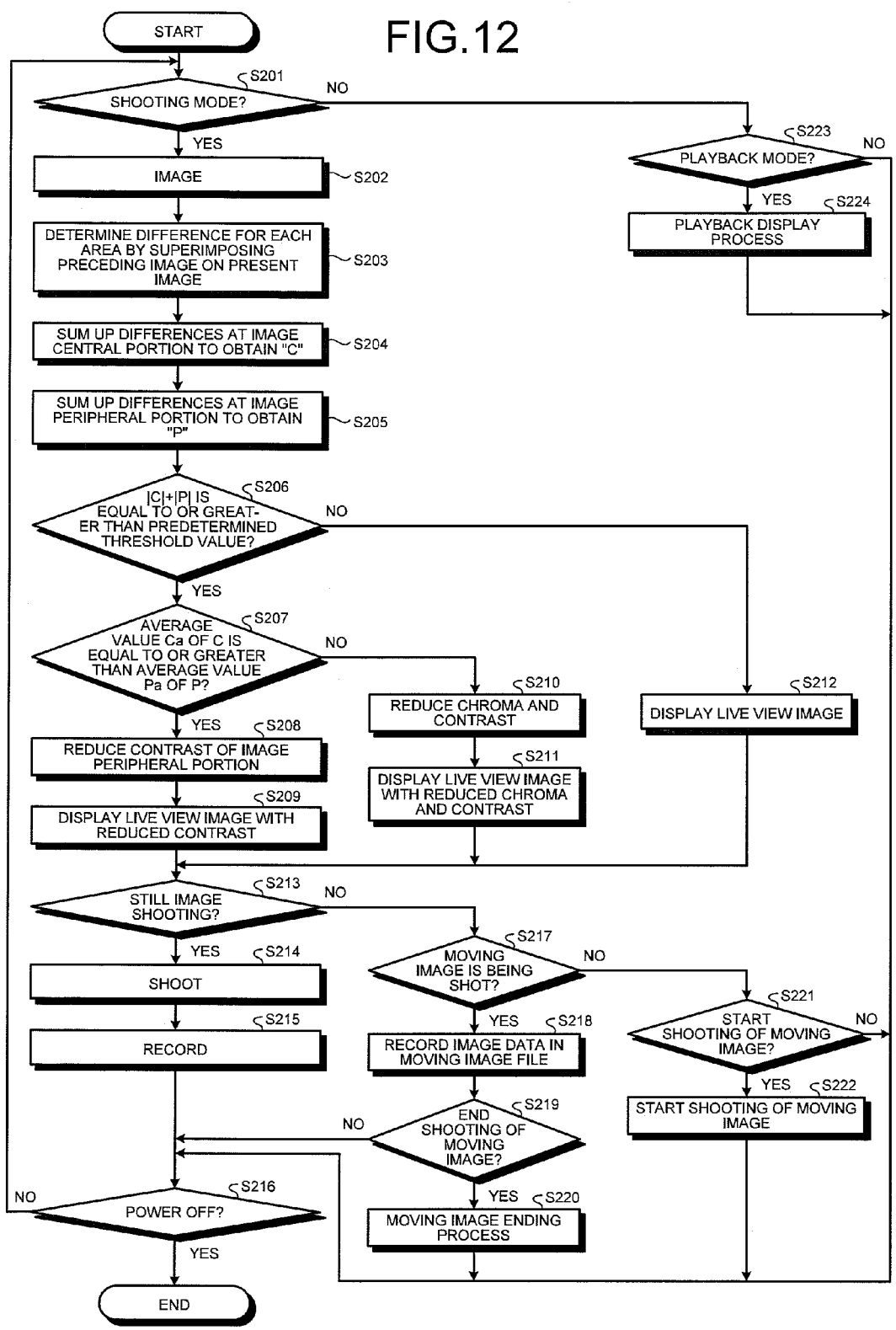
FIG. 12 is a flow chart illustrating an outline of a process executed by the imaging apparatus according to the second embodiment of the present invention.

A process executed by the imaging apparatus 1a having the above configuration will be described. FIG. 12 is a flow chart illustrating an outline of the process executed by the imaging apparatus 1a.

In FIG. 12, first, a case where the imaging apparatus 1a has been set in shooting mode (Step S201: Yes) will be described. In this case, the control unit 20 causes the imaging element 102 to execute shooting (Step S202).

Subsequently, the determining unit 201 starts a determining process of superimposing onto each other the latest image and a preceding image immediately therebefore, which are temporally adjacent to each other, and determining a difference therebetween for each pixel (Step S203), calculates a value by summing up differences between pixels of the latest image and the preceding image at their respective image central portions (hereinafter, the value acquired by summing up the differences between the pixels at the image central portions will be referred to as "C") (Step S204), and calculates a value by summing up differences between pixels of the latest image and the preceding image at their respective image peripheral portions (hereinafter, the value acquired by summing up the differences between the pixels at the image peripheral portions is referred to as "P") (Step S205). The image central portion is a rectangular area including the center of the image. Further, the image peripheral portion is an area excluding the image central portion in the image and is an area from the image central portion of the effective pixel area in the image to the outer edge. Furthermore, the determining unit 201 does not need to make the determination by using all of the respective pixels of the image central portions and the image peripheral portions, and may calculate the differences by decimating the pixels at predetermined intervals. Specifically, the determining unit 201 may calculate a value by summing up differences between respective pixels of predetermined pixel columns, for example, the odd numbered columns or even numbered columns, of the image central portions and image peripheral portions.

Figure 13A:
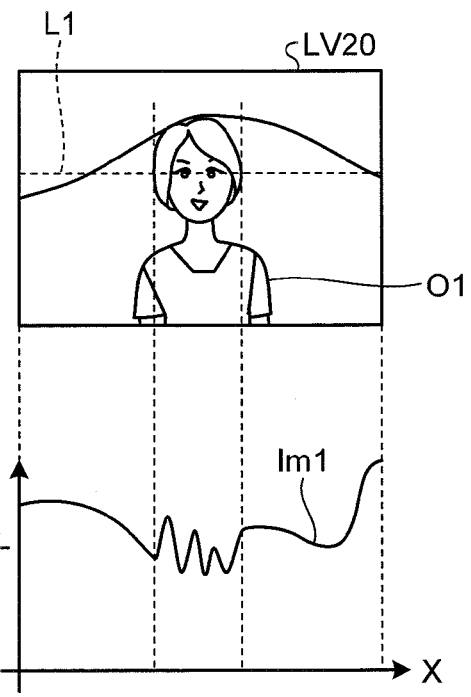
FIG. 13A and FIG. 13B are diagrams schematically illustrating a relation between position and amount of information in a preceding image generated by an imaging unit of the imaging apparatus according to the second embodiment of the present invention.
Figure 13B:
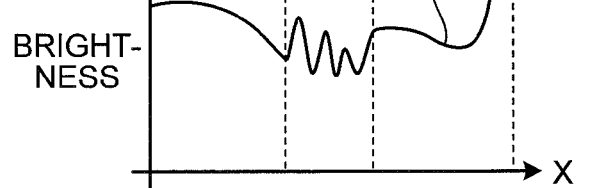
Figure 14A:
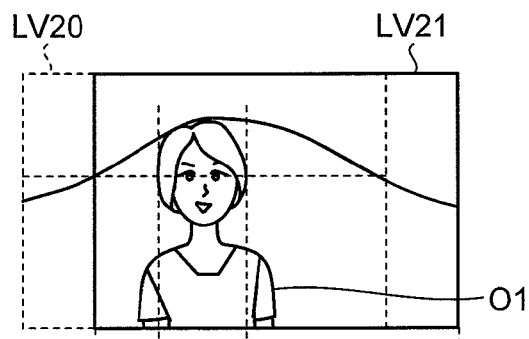
FIG. 14A and FIG. 14B are diagrams schematically illustrating a relation between position and amount of information in a latest image generated by the imaging unit of the imaging apparatus according to the second embodiment of the present invention.
Figure 14B:
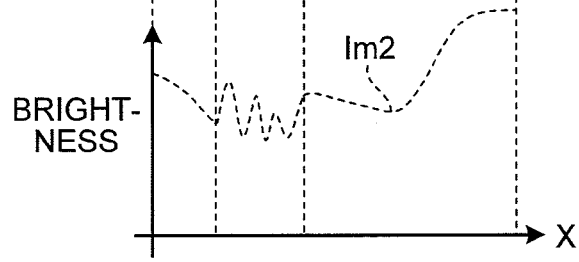

FIG. 13A and FIG. 13B are diagrams schematically illustrating a relation between position and amount of information in the preceding image. FIG. 14A and FIG. 14B are diagrams schematically illustrating a relation between position and amount of information in the latest image. In FIGS. 13A, 13B and FIGS. 14A and 14B, brightness as the amount of information on a straight line L1 will be described as an example. Further, in FIG. 13B and FIG. 14B, the horizontal axis represents the position of each image and the vertical axis represents the brightness.

As illustrated in FIG. 13A, the brightness of the straight line L1 crossing the face of the subject 01 in the preceding image LV20 is represented by a curve Im1 illustrated in FIG. 13B. If a user performs a panning operation in a horizontal direction with respect to the imaging apparatus 1a from the state illustrated in FIG. 13A, the latest image LV21 illustrated in FIGS. 14A and 14B can be acquired. When this is done, the brightness of the straight line L1 crossing the face of the subject 01 in the latest image LV21 is represented by a curve Im2 illustrated in FIG. 14B. The determining unit 201 compares the curve Im1 of FIG. 13B with the curve Im2 of FIG. 14B (see FIG. 15).

Figure 15:
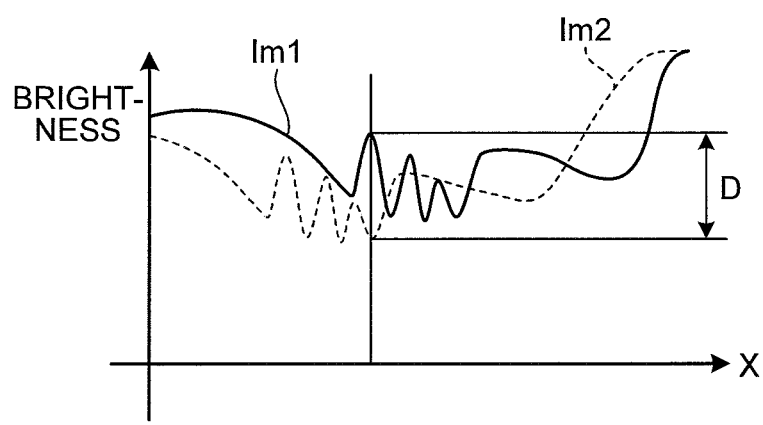
FIG. 15 is a diagram illustrating a relation between brightness and position when a curve of FIG. 13B and a curve of FIG. 14B are virtually superimposed on each other.
Figure 16:
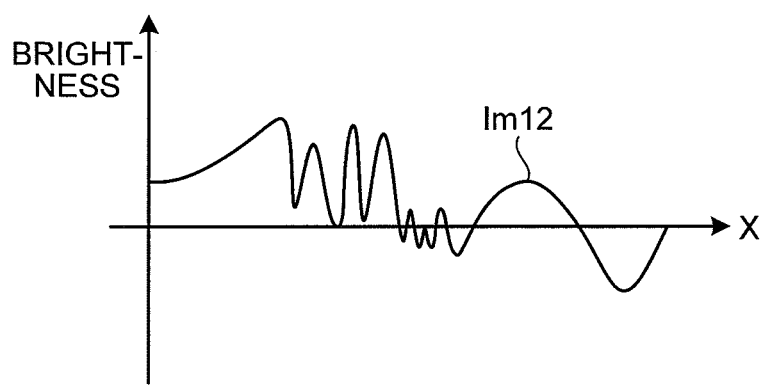
FIG. 16 is a diagram illustrating a relation between difference in brightness and position when the curve of FIG. 13B and the curve of FIG. 14B are virtually superimposed on each other.

FIG. 15 is a diagram illustrating a relation between the brightness and the position when the curve Im1 of FIG. 13B is virtually superimposed on the curve Im2 of FIG. 14B. FIG. 16 is a diagram illustrating a relation between the brightness difference and the position for the curve Im1 of FIG. 13B and the curve Im2 of FIG. 14B.

As illustrated in FIG. 15, a user feels stress just by seeing an image having a difference "D" in a part of images of two frames like the latest image and preceding image temporally adjacent to each other. Further, if a panning operation is performed on a moving image, since the field area of the imaging apparatus 1a is changed according to the panning operation and the color components and the subject therein are changed, a user may feel discomfort. Specifically, like the curve Im12 illustrated in FIG. 16, the larger the amplitude, the larger the image change from the preceding image to the latest image is considered to be. Thus, the determining unit 201 determines an image change of the latest image L21 from the preceding image L20 by calculating the respective differences between the curve Im1 and the curve Im2. That is, the determining unit 201 numerically expresses a change amount of the image change of the latest image L21 from the preceding image L20 by summing up absolute values of respective pixel values of the preceding image and the latest image.

Returning to FIG. 12, description of Step S206 and after will be continued.

At Step S206, the determining unit 201 determines whether or not a sum |C|+|P| of an absolute value |C| of the value "C" acquired by summing up the differences between the pixels at the image central portions and an absolute value |P| of the value "P" acquired by summing up the differences between the pixels at the image peripheral portions is equal to or greater than a predetermined threshold value. If the determining unit 201 determines that the sum |C|+|P| is equal to or greater than the predetermined threshold value (Step S206: Yes), the imaging apparatus 1a proceeds to later described Step S207. On the contrary, if the determining unit 201 determines that the sum |C|+|P| is not equal to or greater than the predetermined threshold value (Step S206: No), the imaging apparatus 1a proceeds to later described Step S212.

At Step S207, the determining unit 201 determines whether or not an average value CA, which is acquired by dividing "C" by the number of pixels at the image central portion is equal to or greater than an average value PA acquired by dividing "P" by the number of pixels at the image peripheral portion. If the determining unit 201 determines that the average value CA of "C" is equal to or greater than the average value PA of "P" (Step S207: Yes), the imaging apparatus 1a proceeds to later described Step S208. On the contrary, if the determining unit 201 determines that the average value CA of "C" is equal to or greater than the average value PA of "P" (Step S207: No), the imaging apparatus 1a proceeds to later described Step S210.

Figure 17:
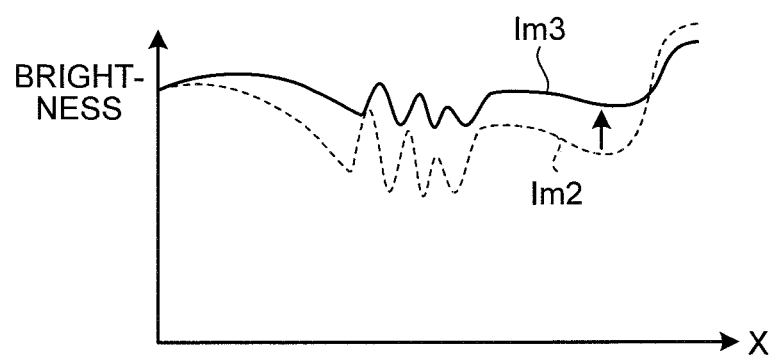
FIG. 17 is a diagram schematically illustrating an outline of a correction process by a suppressing unit of the imaging apparatus according to the second embodiment of the present invention.

At Step S208, the suppressing unit 202 performs image processing of reducing the contrast of the image peripheral portion in the latest image corresponding to the latest image data generated by the imaging unit 10a to generate suppressed image data. Specifically, as illustrated in FIG. 17, the image processing to reduce the contrast of the latest image is performed to decrease the amplitude such that the brightness of the latest image changes from the curve Im2 to the curve Im3.

Figure 18:
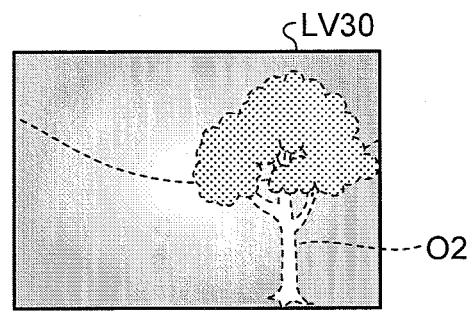
FIG. 18 is a diagram illustrating an example of an image displayed by a display unit of the imaging apparatus according to the second embodiment of the present invention.

Subsequently, the display control unit 203 causes the display unit 11 to display a live view image corresponding to the suppressed image data with the reduced contrast generated by the suppressing unit 202 (Step S209). Specifically, as illustrated in FIG. 18, the display control unit 203 causes the display unit 11 to display a live view image LV30 corresponding to the suppressed image data with the reduced contrast generated by the suppressing unit 202. Thereby, when a user performs a panning operation on the imaging apparatus 1a, contrasts of various subjects 02 and 03 taken between the present subject 01 and the desired subject 04 are reduced to suppress the amount of information visually recognizable in the image upon the panning operation, and thus even if a field area is drastically changed upon moving image shooting or moving image playback, a user is able to perform visual recognition comfortably. In FIG. 18, the reduction in contrast is expressed by dotted lines and shading. After step S209, the imaging apparatus 1a proceeds to later described step S213.

At Step S210, the suppressing unit 202 performs a suppressing process of reducing a chroma and a contrast of the latest image corresponding to the latest image data generated by the imaging unit 10a to generate suppressed image data.

Figure 19:
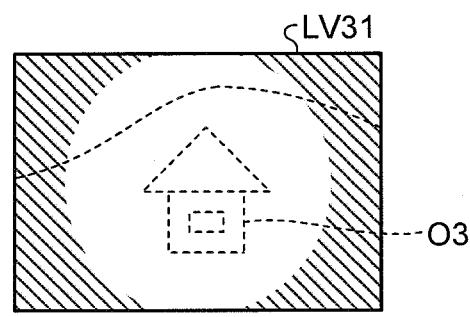
FIG. 19 is a diagram illustrating another example of the image displayed by the display unit of the imaging apparatus according to the second embodiment of the present invention.

Subsequently, the display control unit 203 causes the display unit 11 to display a live view image corresponding to the suppressed image data with the reduced chroma and contrast generated by the suppressing unit 202 (Step S211). Specifically, as illustrated in FIG. 19, the display control unit 203 causes the display unit 11 to display the live view image LV31 corresponding to the suppressed image data with the reduced chroma and contrast generated by the suppressing unit 202. Thereby, when a user performs a panning operation on the imaging apparatus 1a, contrasts of various subjects 02 and 03 taken between the present subject 01 and the desired subject 04 are reduced to suppress the amount of information visually recognizable in the image upon the panning operation, and thus even if a field area is drastically changed upon moving image shooting or moving image playback, a user is able to perform visual recognition comfortably. In FIG. 19, the reduction in chroma and contrast is represented by hatching and dotted lines. After step S211, the imaging apparatus 1a proceeds to later described step S213.

At Step S212, the display control unit 203 causes the display unit 11 to display a live view image corresponding to image data generated by the imaging unit 10a. After step S212, the imaging apparatus 1a proceeds to later described step S213.

Step S213 to Step S222 correspond respectively to above described Step S110 to Step S119 of FIG. 2.

At Step S201, if the imaging apparatus 1a has not been set in shooting mode (Step S201: No), and has been set in playback mode (Step S223: Yes), the imaging apparatus 1a executes a playback display process of playing back an image corresponding to image data recorded in the recording medium 14 (Step S224). After Step S224, the imaging apparatus 1a proceeds to Step S216.

At Step S201, if the imaging apparatus 1a has not been set in shooting mode (Step S201: No) and has not been set in playback mode (Step S223: No), the imaging apparatus 1a proceeds to Step S216.

According to the above described second embodiment of the present invention, even if a field view is drastically changed by a panning operation or a tilting operation upon moving image shooting, a user is able to perform visual recognition comfortably.

The above described second embodiment of the present invention is applied to the case where the panning operation of moving the imaging apparatus 1a in the approximately horizontal direction is performed by a user, but it may be applied to a case where a tilting operation of moving the imaging apparatus 1a in an approximately vertical direction or a viewing angle change in a diagonal direction is performed by a user. Of course, these ways of thinking are applicable to an operation suddenly changing information in a screen, such as a quick zoom operation, and such effects can be said similarly for the prior embodiment.

Further, in the second embodiment of the present invention, the determining unit 201 determines whether or not the field area of the imaging unit 10a has changed by using the two temporally adjacent images, but the images are not necessarily temporally adjacent to each other, and for predetermined frames, for example, by using odd numbered frames or even numbered frames of the image data generated by the imaging unit 10a, whether or not the field area of the imaging unit 10a has changed may be determined. Although the embodiment provided with the communication unit has been described, the image being shot or the shot image may be able to be communicated via a network such that a remote viewer is able to see it. In this case, a case where viewing is performed by an indoor TV must be supposed, but if panning is performed while an image of a high contrast is being viewed indoor, as compared to a case where a small mobile device is held by a hand for viewing, it becomes more physiologically unbearable, and thus a threshold value may be changed according to the destination.

Modified Example of Second Embodiment

Next, a modified example of the second embodiment will be described. In the above described second embodiment, the determining unit 201 compares the respective brightnesses of the preceding image and the latest image temporally adjacent to each other pixel by pixel, but in the modified example of this second embodiment, each of the temporally adjacent preceding image and latest image is divided into predetermined areas and comparison of brightness is performed for each divided area.

Figure 22:
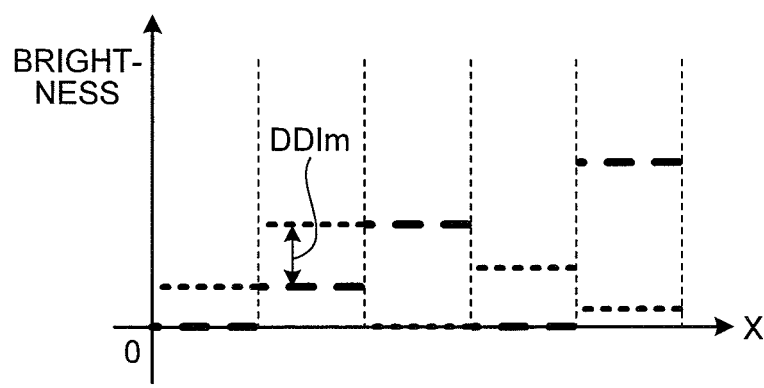
FIG. 22 is a diagram illustrating a relation between brightness and position when a brightness for each area of FIG. 21B and a brightness for each area of FIG. 22B are virtually superimposed on each other.
Figure 23:
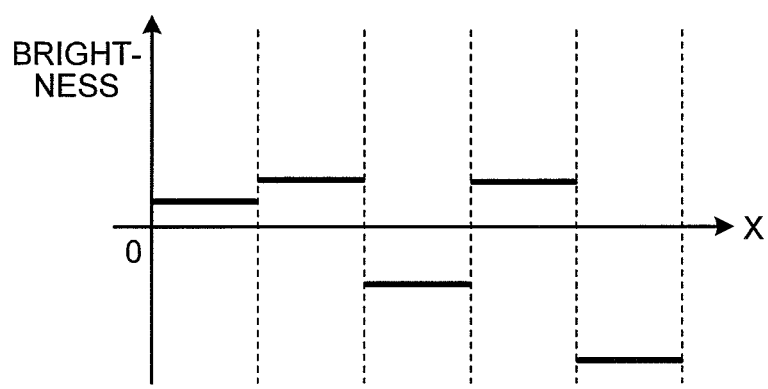
FIG. 23 is a diagram illustrating a relation between brightness and position when brightnesses of respective areas of FIG. 21B and FIG. 22B are virtually superimposed on each other.

FIG. 20A and FIG. 20B are diagrams schematically illustrating a relation between position and amount of information in the preceding image. FIG. 21A and FIG. 21B are diagrams schematically illustrating a relation between position and amount of information in the latest image. FIG. 22 is a diagram illustrating a relation between brightness and position when a brightness for each area of FIG. 20B and a brightness for each area of FIG. 21B are virtually superimposed onto each other. FIG. 23 is a diagram illustrating a relation between difference in brightness (brightness difference) and position when a brightness for each area of FIG. 21B and a brightness for each area of FIG. 22B are virtually superimposed onto each other. In FIG. 20A to FIG. 23, brightness as the amount of information on a straight line L2 will be described as an example. Further, in FIG. 20B, FIG. 21B, FIG. 22, and FIG. 23, the horizontal axis represents the position of each area and the vertical axis represents the brightness.

As illustrated in FIG. 20B, FIG. 21B, and FIG. 22, the determining unit 201 divides the preceding image LV20 and the latest image LV21 into a plurality of predetermined areas and compares a difference DIm between a maximum value and a minimum value of brightness in this area. Specifically, as illustrated in FIG. 22 and FIG. 23, the determining unit 201 compares the differences DIm between the maximum values and minimum values of the brightnesses in the respective areas of the preceding image LV20 and the latest image LV21, determines a difference therebetween as DDIm for each area, and determines that a change in amount of information in the image is large if that difference (brightness difference) is large.

According to the above described modified example of the second embodiment of the present invention, even if a field area has drastically changed due to a panning operation, a tilting operation, or another shooting screen changing operation upon moving image shooting, a user is able to perform visual recognition comfortably.

Third Embodiment

Next, a third embodiment of the present invention will be described. An imaging apparatus according to this third embodiment has a different configuration and executes a different process, from the above described imaging apparatus 1a according to the second embodiment. Specifically, if a panning operation, a tilting operation, or another shooting screen changing operation is performed on the imaging apparatus, the shooting conditions are changed to decrease the amount of visually graspable information. Therefore, hereinafter, after describing the configuration of the imaging apparatus according to this third embodiment, the process executed by the imaging apparatus according to this third embodiment will be described. The same signs will be appended to structural components that are the same as those of the above described second embodiment and description thereof will be omitted.

Figure 24:
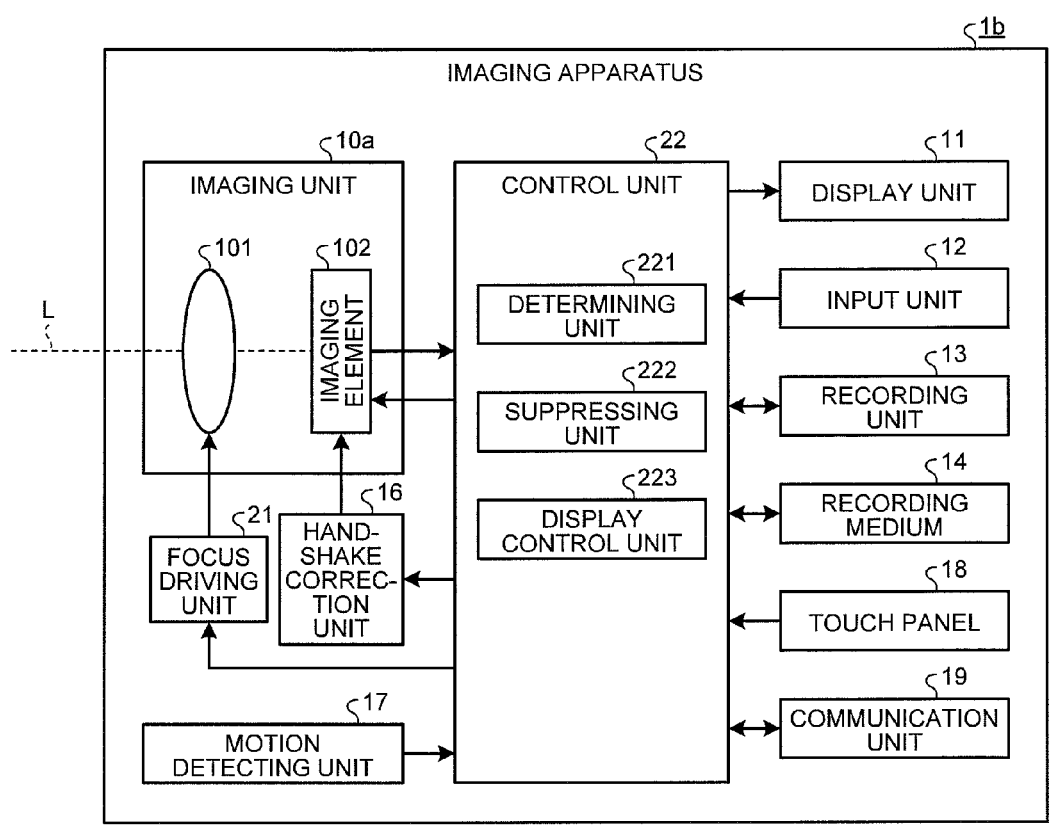
FIG. 24 is a block diagram illustrating a functional configuration of an imaging apparatus according to a third embodiment of the present invention.
Figure 26A:
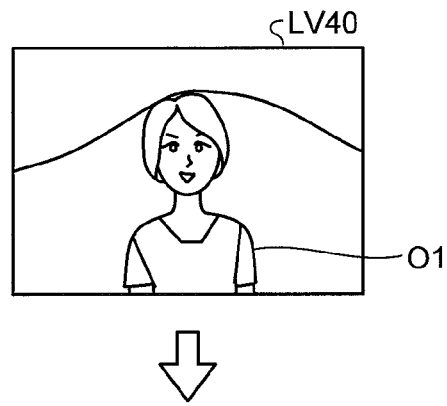
FIG. 26A to FIG. 26D are diagrams illustrating an example of an image displayed by a display unit of the imaging apparatus according to the third embodiment of the present invention.
Figure 26B:
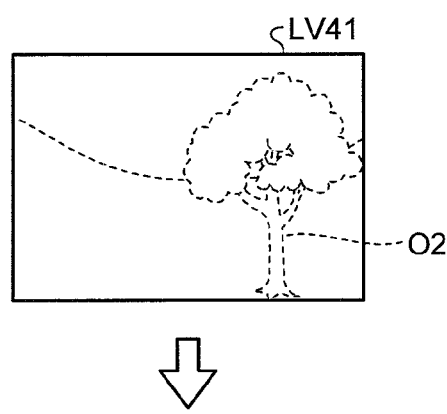
Figure 26C:
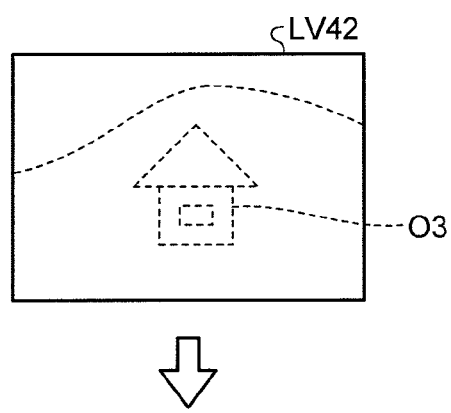
Figure 26D:
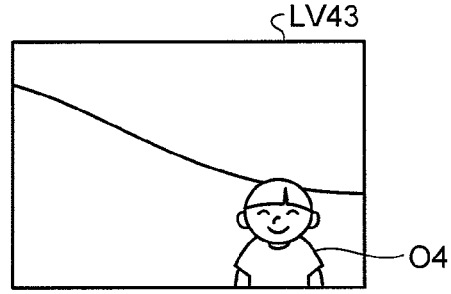
Figure 27A:
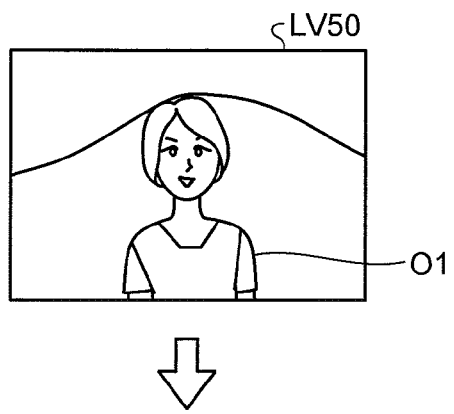
FIG. 27A to FIG. 27D are diagrams illustrating another example of the image displayed by the display unit of the imaging apparatus according to the third embodiment of the present invention.
Figure 27B:
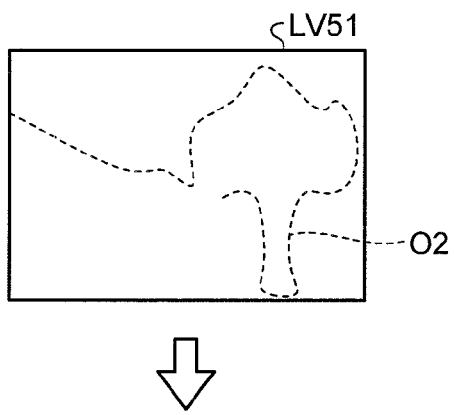
Figure 27C:
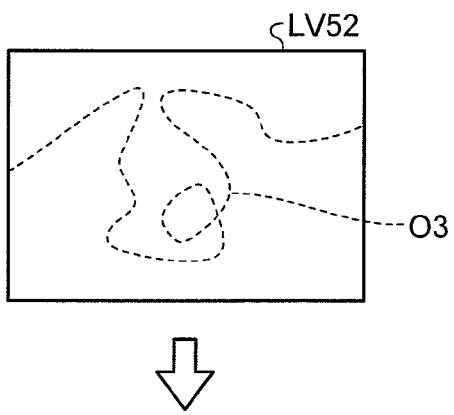
Figure 27D:
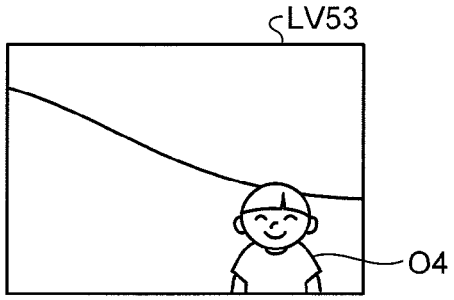

FIG. 24 is a block diagram illustrating a functional configuration of the imaging apparatus according to the third embodiment of the present invention. An imaging apparatus 1b illustrated in FIG. 24 includes the imaging unit 10a, the display unit 11, the input unit 12, the recording unit 13, the recording medium 14, the hand-shake correction unit 16, the motion detecting unit 17, the touch panel 18, the communication unit 19, a focus driving unit 21, and a control unit 22.

The focus driving unit 21 adjusts focus of the imaging unit 10a by moving the lens unit 101 along the optical axis "L", under control by the control unit 22. For example, under the control by the control unit 22, the focus driving unit 21 brings the imaging unit 10a into focus with respect to a subject, by moving the lens unit 101 along the optical axis "L". The focus driving unit 21 is configured by using a stepping motor or the like.

The control unit 22 comprehensively controls operations of the imaging apparatus 1b by performing transfer or the like of instructions and data corresponding to the respective units forming the imaging apparatus 1b. The control unit 22 is configured by using a CPU or the like. In this third embodiment, the control unit 22 functions as an image processing device.

A detailed configuration of the control unit 22 will now be described. The control unit 22 has a determining unit 221, a suppressing unit 222, and a display control unit 223.

The determining unit 221 determines whether or not the field area of the imaging unit 10a has changed. Specifically, the determining unit 221 determines, based on a coincidence between two images corresponding to temporally adjacent image data generated by the imaging unit 10, whether or not the field area of the imaging unit 10a has changed. For example, the determining unit 221 determines a motion caused in the imaging apparatus 1b, for example, a panning operation, a tilting operation, or another shooting screen changing operation by a user, by performing motion determination with respect to two images corresponding to temporally adjacent image data generated by the imaging unit 10a.

If the determining unit 221 determines that the field area of the imaging unit 10a has changed, the suppressing unit 222 generates suppressed image data with the amount of visually recognizable information included in an image corresponding to image data generated by the imaging unit 10a being reduced. Specifically, the suppressing unit 222 performs image processing of increasing an exposure value, for example, image processing to achieve overexposure, for the image corresponding to the image data generated by the imaging unit 10a, to generate the suppressed image data. Further, the suppressing unit 222 drives the focus driving unit 21 and adjusts the focus of the lens unit 101 such that the image corresponding to the image data generated by the imaging element 102 becomes out of focus.

The display control unit 223 causes the display unit 11 to display the image corresponding to the image data generated by the imaging unit 10a. Further, if the determining unit 221 determines that the field area of the imaging unit 10a has changed, the display control unit 223 causes the display unit 11 to display a suppressed image corresponding to the suppressed image data generated by the suppressing unit 222. Furthermore, the display control unit 223 causes the display unit 11 to display operational information related to the imaging apparatus 1b. In this third embodiment, the display control unit 223 functions as an output unit.

A process executed by the imaging apparatus 1b having the above configuration will be described. FIG. 25 is a flow chart illustrating an outline of the process executed by the imaging apparatus 1b.

As illustrated in FIG. 25, first, a case where the imaging apparatus 1b has been set in shooting mode (Step S301: Yes) will be described. In this case, the control unit 22 causes the imaging element 102 to execute shooting (Step S302).

Subsequently, the determining unit 221 determines, based on the latest image and the preceding image temporally adjacent to each other, whether or not the entire screen of the latest image (the entire field area) has moved from the entire screen of the preceding image (Step S303). Specifically, the determining unit 221 determines whether or not the amount of information of respective pixels of the latest image and the preceding image temporally adjacent to each other is equal to or greater than a first threshold value. The first threshold value may be changed as appropriate according to the frame rate of the imaging element 102. If the determining unit 221 determines that the entire screen of the latest image has moved from the entire screen of the preceding image (Step S303: Yes), the imaging apparatus 1b proceeds to later described Step S304. On the contrary, if the determining unit 221 determines that the entire screen of the latest image has not moved from the entire screen of the preceding image (Step S303: No), the imaging apparatus 1b proceeds to later described Step S311.

At Step S304, the determining unit 221 determines, based on the temporally adjacent latest image and preceding image, whether or not a moving direction of the latest image is equal to or greater than ⅓ with respect to the entire screen of the preceding image. If the determining unit 221 determines that the moving direction of the latest image is equal to or greater than ⅓ with respect to the entire screen of the preceding image (Step S304: Yes), the imaging apparatus 1b proceeds to later described Step S305. On the contrary, if the determining unit 221 determines that the moving direction of the latest image is not equal to or greater than ⅓ with respect to the entire screen of the preceding image (Step S304: No), the imaging apparatus 1b proceeds to later described Step S311.

At Step S305, the determining unit 221 determines whether or not the contrast of the latest image is less than a predetermined threshold value. If the determining unit 221 determines that the contrast of the latest image is less than the predetermined threshold value (Step S305: Yes), the imaging apparatus 1b proceeds to later described Step S306. On the contrary, if the determining unit 221 determines that the contrast of the latest image is not less than the predetermined threshold value (Step S305: No), the imaging apparatus 1b proceeds to later described Step S311.

At Step S306, the determining unit 221 determines whether or not a subject in the latest image is a subject brighter than a predetermined threshold value. If the determining unit 221 determines that the subject in the latest image is a subject brighter than the predetermined threshold value (Step S306: Yes), the imaging apparatus 1b proceeds to later described Step S307. On the contrary, if the determining unit 221 determines that the subject in the latest image is not a subject brighter than the predetermined threshold value (Step S306: No), the imaging apparatus 1b proceeds to later described Step S309.

At Step S307, the suppressing unit 222 performs image processing of increasing an exposure value of image data generated by the imaging unit 10a. Specifically, the suppressing unit 222 performs correction of increasing the exposure value of the image data generated by the imaging unit 10a, for example, from "+0.0" to "+2.0".

Subsequently, the display control unit 223 causes the display unit 11 to display a live view image corresponding to the image data with the exposure value increased by the suppressing unit 222 (Step S308). Specifically, as illustrated in FIG. 26A to FIG. 26D, if a panning operation is performed when the display unit 11 is displaying a live view image LV40, the display control unit 223 causes the display unit 11 to display a live view image LV41 and a live view image LV42 corresponding to the image data with the exposure value increased by the suppressing unit 222. Thereafter, the display control unit 223 causes the display unit 11 to display a live view image LV43 as the panning operation is finished (FIG. 26A→FIG. 26B→FIG. 26C→FIG. 26D). Thereby, if a user performs a panning operation on the imaging apparatus 1b, an exposure value of image data is automatically increased and an image of overexposure is displayed upon playback. As a result, since an amount of visually recognizable information in an image upon a panning operation is suppressed, even if a field area is drastically changed upon moving image shooting or moving image playback, a user is able to perform visual recognition comfortably. After step S308, the imaging apparatus 1b proceeds to step S312.

At Step S309, the suppressing unit 222 drives the focus driving unit 21 to move the lens unit 101 along the optical axis "L" to thereby adjust the focus point with respect to the subject.

Subsequently, the display control unit 223 causes the display unit 11 to display a live view image corresponding to image data generated by the imaging unit 10a in the state where the focus point has been adjusted (Step S310). Specifically, as illustrated in FIG. 27A to FIG. 27D, if a panning operation is performed when the display unit 11 is displaying a live view image LV50, the display control unit 223 causes the display unit 11 to sequentially display a live view image L51 and a live view image LV52 corresponding to image data generated by the imaging unit 10a in the state where the focus point has been adjusted by the suppressing unit 222, for example, in a state where the lens unit 101 is away from the focus position (focusing position) to be out of focus with respect to the subject. Thereafter, the display control unit 223 causes the display unit 11 to display a live view image LV53 corresponding to image data generated by the imaging unit 10a in a state where the focus point is caused to be in focus with respect to the subject by the suppressing unit 222 as the panning operation is finished (FIG. 27A→FIG. 27B→FIG. 27C→FIG. 27D). Thereby, if a user performs a panning operation on the imaging apparatus 1b, a focus position is automatically adjusted with respect to a subject, and thus a blurred image is displayed upon playback. As a result, since an amount of visually recognizable information in an image upon a panning operation is suppressed, even if a field area is drastically changed upon moving image shooting or moving image playback, a user is able to perform visual recognition comfortably. After step S310, the imaging apparatus 1b proceeds to step S312.

Step S311 to Step S323 respectively correspond to above described Step S212 to Step S224 of FIG. 12.

According to the above described third embodiment of the present invention, even if a field area is drastically changed by a panning operation or a tilting operation upon moving image shooting, a user is able to perform visual recognition comfortably.

In the third embodiment of the present invention, although the suppressing unit 222 causes the image displayed by the display unit 11 to be overexposed by increasing the exposure value of the image data generated by the imaging unit 10a, for example, the display unit 11 may be caused to perform display by the number of pixels of the image data generated by the imaging unit 10a being decreased, for example. Specifically, If there is a panning operation on the imaging apparatus 1b, the suppressing unit 222 performs image processing of suppressing the number of pixels of an image corresponding to image data generated by the imaging unit 10a to generate suppressed image data, and the display control unit 223 causes the display unit 11 to display a live view image corresponding to the suppressed image data generated by the suppressing unit 222. For example, as illustrated in FIG. 28A to FIG. 28D, if a panning operation is performed on the imaging apparatus 1b when the display unit 11 is displaying a live view image LV60, the display control unit 223 causes the display unit 11 to sequentially display a live view image LV61 and a live view image LV62 corresponding to suppressed image data generated by the suppressing unit 222. Thereafter, the display control unit 223 causes the display unit 11 to display a live view image LV63 corresponding to image data generated by the imaging unit 10a as the panning operation is finished (FIG. 28A→FIG. 28B→FIG. 28C→FIG. 28D). Thereby, even if the field area of the imaging apparatus 1b is drastically changed upon moving image shooting or moving image playback, the number of pixels of an image during the panning operation is decreased to decrease the amount of information visually recognizable by a user, and thus the user is able to perform visual recognition comfortably.

Other Embodiments

In addition, an image processing device according to the present invention is applicable to, in addition to a digital single-lens reflex camera, for example, a digital camera, a digital video camera, an electronic device, such as a portable telephone or tablet type portable device having an imaging function, a microscope apparatus that is able to change the field area upon moving image shooting, and a processor unit of an endoscope apparatus.

Further, an imaging apparatus according to the present invention may have a lens unit freely attachable to and detachable from a main body unit, or a lens unit integrally formed with the main body unit.

Further, a program to be executed by an image processing device according to the present invention is provided as file data of an installable format or executable format, the file data being recorded in a computer readable recording medium, such as a CD-ROM, a flexible disk (FD), a CD-R, a digital versatile disk (DVD), a USB medium, or a flash memory.

Further, a program to be executed by an image processing device according to the present invention may be configured to be stored on a computer connected to a network such as the Internet and provided by causing it to be downloaded via the network. Furthermore, a program to be executed by the image processing device according to the present invention may be configured to be provided or distributed via a network such as the Internet.

In describing the flow charts in this specification, context of the processes among the steps is disclosed by using expressions, such as "first", "thereafter", and "subsequently", but the sequences of the processes necessary for carrying out the present invention are not uniquely defined by these expressions. That is, the procedural sequences in the flow charts described in this specification may be changed as far as there is no contradiction.

Accordingly, the present invention may include various embodiments not described herein, and various design changes or the like within the technical ideas specified by the scope of the claims may be made.

According to the present invention, an effect of being able to make a user to perform visual recognition comfortably is achieved even if a field area is drastically changed upon shooting of a moving image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
an imaging unit configured to continuously image a field area and sequentially generate a plurality of image data;
an image processing device comprising:
   a determining unit configured to determine, in accordance with two images corresponding to temporally adjacent image data input from the imaging unit, whether or not the field area at a time of imaging has been changed; and
   a suppressing unit configured to generate and output suppressed image data with an amount of visually recognizable information included in the images being suppressed by performing image processing of reducing at least one of a contrast and a chroma of the images responsive to the determining unit determining that the field area at the time of imaging has been changed due to panning, tilting, or another shooting screen changing operation to capture a desired subject after capture of an initial subject; and
a display unit configured to display a suppressed image corresponding to the suppressed image data generated by the suppressing unit,
wherein the imaging unit comprises:
   a lens unit configured to condense light from the field area and capable of adjusting a focus point; and
   an imaging element configured to generate the image data by receiving the light condensed by the lens unit, wherein
the suppressing unit is configured to adjust the focus point of the lens unit such that an image corresponding to the image data generated by the imaging element becomes out of focus.

2. An imaging device comprising:
an imaging unit configured to continuously image a field area and sequentially generate a plurality of image data;
an image processing device comprising:
   a determining unit configured to determine, in accordance with two images corresponding to temporally adjacent image data input from the imaging unit, whether or not the field area at a time of imaging has been changed; and
   a suppressing unit configured to generate and output suppressed image data with an amount of visually recognizable information included in the images being suppressed by performing image processing of reducing at least one of a contrast and a chroma of the images responsive to the determining unit determining that the field area at the time of imaging has been changed due to panning, tilting, or another shooting screen changing operation to capture a desired subject after capture of an initial subject;
a display unit configured to display a suppressed image corresponding to the suppressed image data generated by the suppressing unit; and
a display controller configured to generate a superimposed image by superimposing a latest of the plurality of image data with the suppressed image and cause the display unit to display the superimposed image at the time the determining unit determines that the field area at the time of imaging has been changed.

3. The imaging device according to claim 1, wherein the determining unit determines whether or not the field area at a time of imaging has been changed by calculating difference in brightness between the two images corresponding to temporally adjacent image data for each one of a plurality of divided area.

4. The imaging device according to claim 2, wherein the determining unit determines whether or not the field area at a time of imaging has been changed by calculating difference in brightness between the two images corresponding to temporally adjacent image data for each one of a plurality of divided area.

* * * * *